(12) United States Patent
Ochoa

(10) Patent No.: US 7,861,760 B2
(45) Date of Patent: Jan. 4, 2011

(54) PORTABLE TIRE DEMOUNTING TOOL

(76) Inventor: Sandy Ochoa, 505 24th St., Alamogordo, NM (US) 88310

( * ) Notice: Subject to any disclaimer, the term of this patent is extended or adjusted under 35 U.S.C. 154(b) by 44 days.

(21) Appl. No.: 12/323,254

(22) Filed: Nov. 25, 2008

(65) Prior Publication Data

US 2010/0051205 A1    Mar. 4, 2010

Related U.S. Application Data

(63) Continuation-in-part of application No. 12/203,296, filed on Sep. 3, 2008.

(51) Int. Cl.
*B60C 25/02* (2006.01)
(52) U.S. Cl. .......................... 157/1.45; 157/1.3
(58) Field of Classification Search .................. 157/1.3, 157/1.17, 1.45
See application file for complete search history.

(56) References Cited

U.S. PATENT DOCUMENTS

| | | | | |
|---|---|---|---|---|
| 1,475,519 A | * | 11/1923 | Snider | 157/1.17 |
| 1,519,558 A | * | 12/1924 | Snider | 157/1.17 |
| 1,806,947 A | * | 5/1931 | Mjelva | 157/1.17 |
| 2,509,945 A | * | 5/1950 | Strech et al. | 157/1.17 |
| 2,684,710 A | * | 7/1954 | Calvin | 157/1.17 |
| 4,524,813 A | * | 6/1985 | Gering | 157/1.17 |
| 4,589,462 A | * | 5/1986 | Giles | 157/1.17 |
| 4,785,865 A | * | 11/1988 | Folstad | 157/1.17 |
| 4,800,943 A | * | 1/1989 | Umemoto et al. | 157/1.17 |
| 4,890,661 A | * | 1/1990 | Goebel | 157/1.3 |
| 4,913,770 A | * | 4/1990 | Sims | 157/1.17 |
| 4,995,439 A | * | 2/1991 | Burge | 157/1.17 |
| 5,191,934 A | * | 3/1993 | Wicklund | 157/1.17 |
| 5,421,392 A | * | 6/1995 | Unrau | 157/1.17 |

* cited by examiner

*Primary Examiner*—David B Thomas
(74) *Attorney, Agent, or Firm*—Dennis F. Armijo

(57) ABSTRACT

A method and apparatus for demounting tires from wheel assemblies with a hook assembly and a prying foot. One tool has two holding hooks that grasp the tool to the wheel and a foot that is attached to the holding hooks, and a bearing pivot point that allows the demounting tool to easily and safely remove the tire from the wheel. The tool can be used for all types of tire and wheel types. One tool is for large truck and trailer tires and a second too is for light truck, trailer and automobile tires. A third tool is designed for low profile, stiff sidewall tires and includes a telescoping structure to raise and lower the dual hooks. A forth embodiment is for demounting a first and second bead using a fixed pivot hook, sized prying feet and a telescoping assembly for pulling the bead from the wheel assembly.

20 Claims, 23 Drawing Sheets

PORTABLE TIRE DEMOUNTING TOOL

CROSS-REFERENCE TO RELATED APPLICATIONS

This application is a continuation-in-part of U.S. patent application Ser. No. 12/203,296 entitled "Portable Tire Demounting Tool", filed on Sep. 3, 2008, the teachings of which are incorporated herein by reference.

BACKGROUND

1. Field of the Invention (Technical Field)

The presently claimed invention generally relates to tire tools and more particularly to hand operated portable tire demounting tools and assisting components thereof.

2. Background Art

There is a large variety of hand operated and power assisted tire demounting tools on the market. They range from simple pry bars too geometrically complex leveraging devices, along with power operated demounting devices.

With the wide range of composite materials, sizes, bead shapes, and methods of manufacture for tire and wheel assemblies, there are a number of inherent limitations to the current methods and apparatuses for tire demounting. These limitations range from functionality to adaptability. They fail to address some key factors in the successful removal of a tire from the rim or wheel assembly.

The functionality of the prior art systems for demounting tires is limited in a number of ways. Many conventional pry spoons and bars are made with a narrow design in relationship to the tire bead. This results in damage and tearing of the tire bead while trying to remove the tire from the wheel. The construction of low profile tires also is a limiting factor for many of the current tools. These low profile sidewalls and the use of multi-ply steel or fiber construction, make these tires stiff and difficult to work with. Power operated devices tend to tear and ruin the bead of these types of tires. Hand tools often prove ineffective, having neither the shape to conform to such tires or the prying force to extract it from the rim or wheel. Removal of these tires with the current devices results in damaging the tire beyond repair, and, thus, defeating the purpose of repairing and remounting the tire.

A further limiting factor for many of the current tools is removal of soft side wall tires with a highly pliable bead. These tires present the problem of having a bead that stretches, but becomes difficult to extract from the wheel. The highly pliable bead will typically be pried above the rim only in the area directly engaged by the tool or pry bar. Disengaging the tool from this area will cause the elastic bead to return to its original position, thus failing to remove the tire from the rim. The narrow hand operated spoons and pry bars are especially susceptible to this malfunction, and there is often the added consequence of bead tearing.

The current conventional hand tire demounting tools fail in their adaptability because they are confined to being used with specific sized tires and wheel assemblies. Power type tools are also limited in their range of size, type of wheel, and tire assemblies to work effectively. The power operated tools are further limited in their ability to work in remote locations away from air, electric, hydraulic or other power sources. Further, some wheel assemblies have "a reverse wheel" having the main part of the hub center offset to the top of the demounting side. This type of hub center limits the leveraging stroke of the current pry bar type tools to such a degree that they are ineffective.

Finally, these prior art methods, whether power or hand operated tire demounting systems, fail to address a key issue in the successful demounting of a tire from its rim assembly, namely the manipulation of the bead into a shallow channel that is referred to as the drop center of the wheel assembly during the demounting procedure. This drop center is a channel in the wheel assembly running parallel to the plane of the rim flanges, and having a circumference smaller than the rim flanges in the trough of the channel. The tire bead must be directed into this channel or trough on the opposite side from which the demount tool engages the bead during the demounting procedure. Channeling the bead into this drop center in this fashion allows enough slack in the tire bead so it may be removed from the rim without excessive stretching or tearing of the bead. The prior art methods, whether power or hand operated tire demounting systems, have no mechanical means to ensure that the bead is in the drop center, thereby allowing undue pressure to be placed on the tire bead during demounting and causing further damage to the bead or resulting in an unsuccessful demounting procedure.

SUMMARY

Aspects disclosed herein address the above stated needs by apparatuses, methods, and systems for demounting a plurality of different types of tires from a plurality of rims without causing damage to the tire bead.

Disclosed is a hand operated demounting tool. A handle, preferably a cylindrical member, of adequate length provides sufficient leveraging pressure and mechanical advantage to the tire bead during the demounting procedure. The handle accommodates gripping positions along its length for an operator to grip the tool during the demounting procedure. At one end it can have a molded plastic or rubber grip. On the second end is an open spanning element. This element consists of a yoke connected, and running substantially perpendicular to the length of the handle. On either side of this yoke assembly are two upright members running substantially parallel to the handle. This facilitates the spanning of the wheel center on reverse wheel assemblies where the cup of the wheel is to the topside of the demount position by allowing an increased prying stroke.

Attached to the handle on the end of the spanning element is a prying foot placed substantially at a right angle in relationship to the handle. The prying foot is of a predetermined length to engage one side of the bead and side wall of the tire and to provide a mechanical advantage in relationship to the handle during the demounting procedure. The prying foot has a novel shape to easily be inserted into the tire cavity between the bead and the outer portion of the rim flange while maintaining the engagement of the tire bead and side wall to provide adequate prying pressure during the demount procedure. This unique shape works on both low profile and stiff sidewall tires. It also facilitates its use on soft sidewall tires as well, prying enough of the bead over the rim flange to demount the tire effectively in one simple prying motion.

The prying foot is of adequate Width to engage enough of the tire bead during the demount procedure to preserve the tire bead from tearing or being damaged and to ease the release of the tire bead from the rim and wheel assembly.

Another aspect of the hand operated tool is dual rim hooks. The dual rim hooks work in conjunction with the prying foot and are concurrently inserted between the tire bead and rim flange. The dual rim hooks are shaped components to grab the rim flange and each of the rim hooks are substantially the same size, shape, and dimension and are placed parallel to one another and disposed on either side of the prying foot. The dual rim hooks have an axle pivot point near the heel portion of the prying foot running through an enclosed tubular bearing surface that is permanently attached to the heel portion of the prying foot. The axle pivot joins the two rim hooks together so that they rotate on the same plane in unison. The axle pivot assembly is affixed substantially parallel to the tire bead when the tool is inserted between the tire bead and rim flange. The dual rim hooks are further shaped for easy insertion between the rim flange and tire bead. In addition, the hooks are shaped to engage the rim flange at two points when the tool is inserted between the tire bead and wheel flange. After engagement of the prying foot and dual rim hooks on a mounted tire/wheel assembly, when the handle portion is raised from a substantially horizontal position to a substantially vertical position, the dual rim hooks "hooking feature" engages the rim flange, thereby locking the prying portions of the tool into proper working position. As the handle portion continues on its demounting arc of motion a "heel portion" of the dual rim hook, which extends past the axle portion of the pivot assembly, engages the inside surface of the rim flange. In addition, the prying foot begins to pivot away from the dual rim hooks which remain engaged to the rim flange via the "hooking feature". This provides a fixed pivot point by which the mechanical advantage and leveraging pressure are increased upon the prying foot during the demounting procedure, thereby making the demounting of the tire easier and more stable as opposed to conventional methods.

Due to the variety of shapes and sizes of tire and wheel assemblies, these tools and their subsequent methods of operation may require unique sizing and geometry of the tool; however the operational principles remain the same.

An alternative demounting apparatus and method includes a retractable mechanism for adding a linear axis of motion to peel the tire from the wheel assembly. Thus, instead of prying the tire from the wheel by pushing down on the handle, the tool has a telescoping feature that performs the same task. This tool is very useful in removing the second or bottom bead from the wheel. Similar to the first embodiment, this embodiment has a hollow handle portion, connected to a prying foot. In this alternative embodiment the spanning element is eliminated. A hole is placed in the bottom of the prying foot to match the position of the hollow portion of the handle. A drive assembly is inserted and housed inside the top portion of the hollow handle, along its length, and on the opposite end of the prying foot. The drive assembly can be a threaded bolt with a washer, a bushing, and a second bushing/retainer. The entire drive assembly is disposed in the hollow tubular handle running parallel with its length. Once in place the entire assembly remains fixed in place, but allows the drive bolt of the drive assembly to spin freely.

The hole at the bottom of the prying foot is shaped to accept a retractable element to be received into the hollow handle portion in a telescoping fashion from the bottom side of the prying foot. This retractable element maintains a close tolerance in the hollow handle and yet slides freely in a motion parallel with the length of the hollow handle. In this embodiment the hollow tube and the retractable element are preferably square tubing to eliminate a rotating or twisting motion. Other telescoping shapes and methods may be used to accomplish this same feature, and would be obvious to those skilled in the art. The retractable element is of a length slightly smaller than the hollow handle. At the top end, retractable element has a female threaded structure recessed into the tube running parallel with its length. At the bottom end is an axle pivot point element, such as the one described in the first embodiment. The retractable element is placed into the hollow handle portion of the tool via the receiving aperture at the bottom of the prying foot, top end first, where the dual rim hooks run parallel with the length of the prying foot. As it is slid into place, the threads on the bolt of the drive assembly engage the female thread of the retractable element on it top side. An appropriate wrench or ratchet is then used to rotate the head of the bolt on the drive assembly running the treads up until the dual hook assembly and the prying foot are on a parallel plane.

Another embodiment can be used to remove the first and second bead from a wheel assembly. This embodiment is similar to the aforementioned telescoping or retractable embodiment; however it has a single fixed pivot rim hook for engaging the rim flange and a shaped prying foot, a first predetermined shape for the first bead and a second predetermined shape for the second bead of the tire. The fixed pivot rim hook is temporarily affixed to the rim flange and the shaped prying foot is pulled away from the rim when the telescoping system is engaged.

The method of demounting a tire using these embodiments is hereafter described. The prying foot and dual hooks or fixed pivot rim hooks are inserted in between the tire bead and the wheel rim in the same fashion as described earlier. A rotating motion is used to pry the tire from the wheel in the same fashion as described earlier until the tool has gone from a substantially horizontal position to a substantially vertical position. At this point the operator engages the drive mechanism with the appropriate hand operated wrench or ratchet or spin wrench, and begins to retract the prying foot in a linear motion thereby peeling the tire effectively from the rim assembly. After the tire has been successfully removed from the rim assembly the operator will reverse the motion and return the tool to its original starting position with the prying foot and the dual hook assembly or fixed pivot rim hook assembly on the same working plane.

These tools, being hand operated, need no outside power sources such as electric, hydraulic, air or the like, although power tools can be used to raise and lower the telescoping embodiments.

It is the general object of the presently claimed invention to provide a novel and advanced method for the demounting of tires from their wheel or rim assemblies along with the accompanying systems which solve the above mentioned problems.

An objective of the presently claimed invention is to provide a hand operated tool or tools which remove a tire from a wheel assembly effectively while preserving the tire bead, and can be used on low profile and multi-ply, stiff side wall tires.

Yet another object of the presently claimed invention is to provide a hand operated tool or tools which will remove the tire from the wheel assembly effectively on soft sidewall, highly pliable tires while preserving the tire bead and the usefulness of the tire.

Another object of the presently claimed invention is to provide a hand operated tool or tools which will work on a variety of tire and wheel assemblies, including reverse wheel and tire assemblies, and standard wheel and tire assemblies.

An advantage of the presently claimed invention is that it can be used in remote locations and does not require air, electric or hydraulic power sources.

Another advantage of the presently claimed invention is that it ensures that the bead on the opposite side of the demount tool is successfully guided into the drop center of the wheel assembly.

Other objects, advantages and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the presently claimed invention. The objects and advantages of the presently claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the presently claimed invention and, together with the description, serve to explain the principles of the presently claimed invention. The drawings are only for the purpose of illustrating a preferred embodiment of the presently claimed invention and are not to be construed as limiting the presently claimed invention. In the drawings:

DESCRIPTION OF THE PREFERRED EMBODIMENTS

Best Modes for Carrying Out the Presently Claimed Invention

Figure 1:
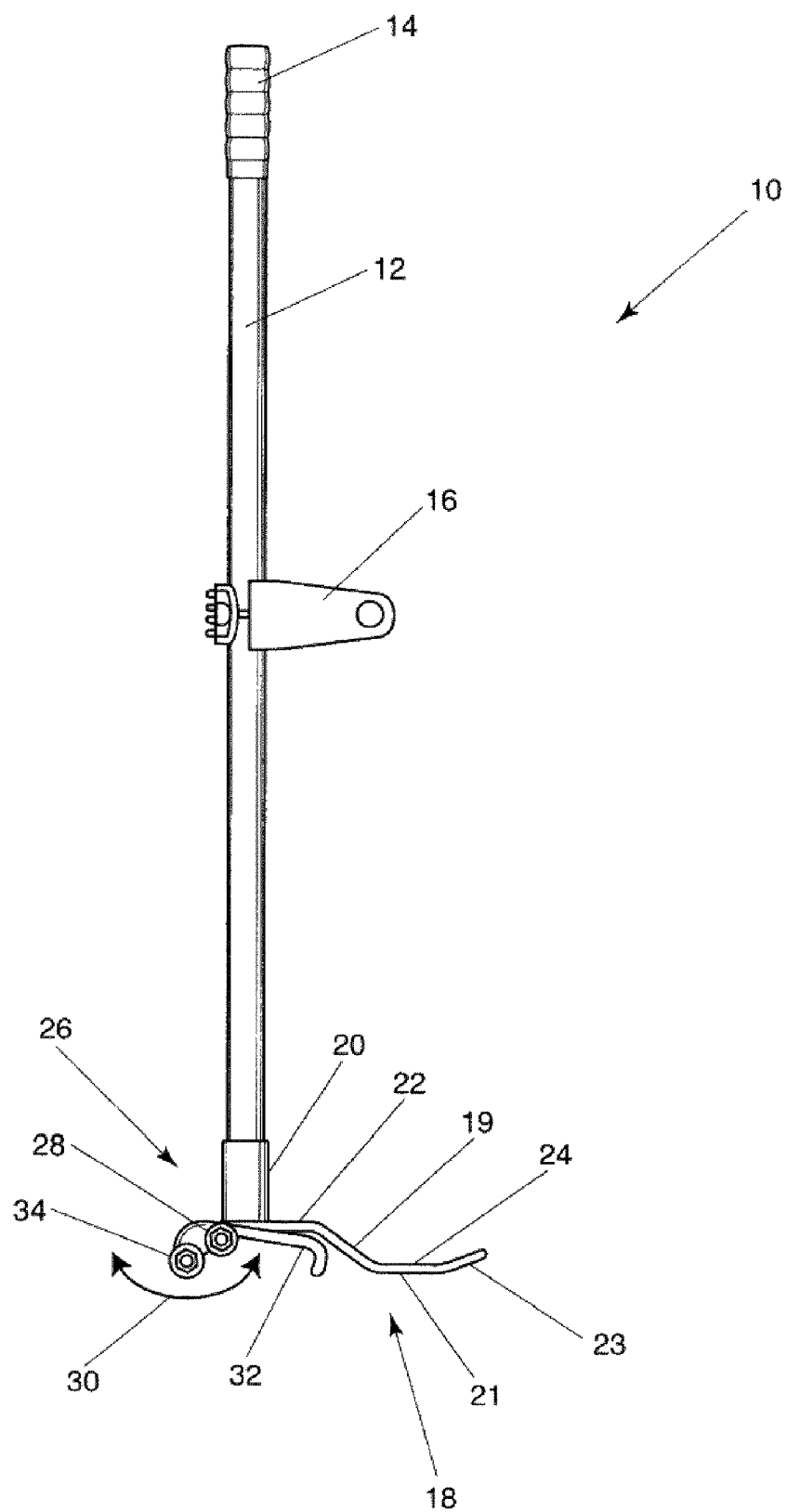
FIG. 1 is a side view of a first embodiment of a demount tool for large truck and trailer tires.
Figure 2:
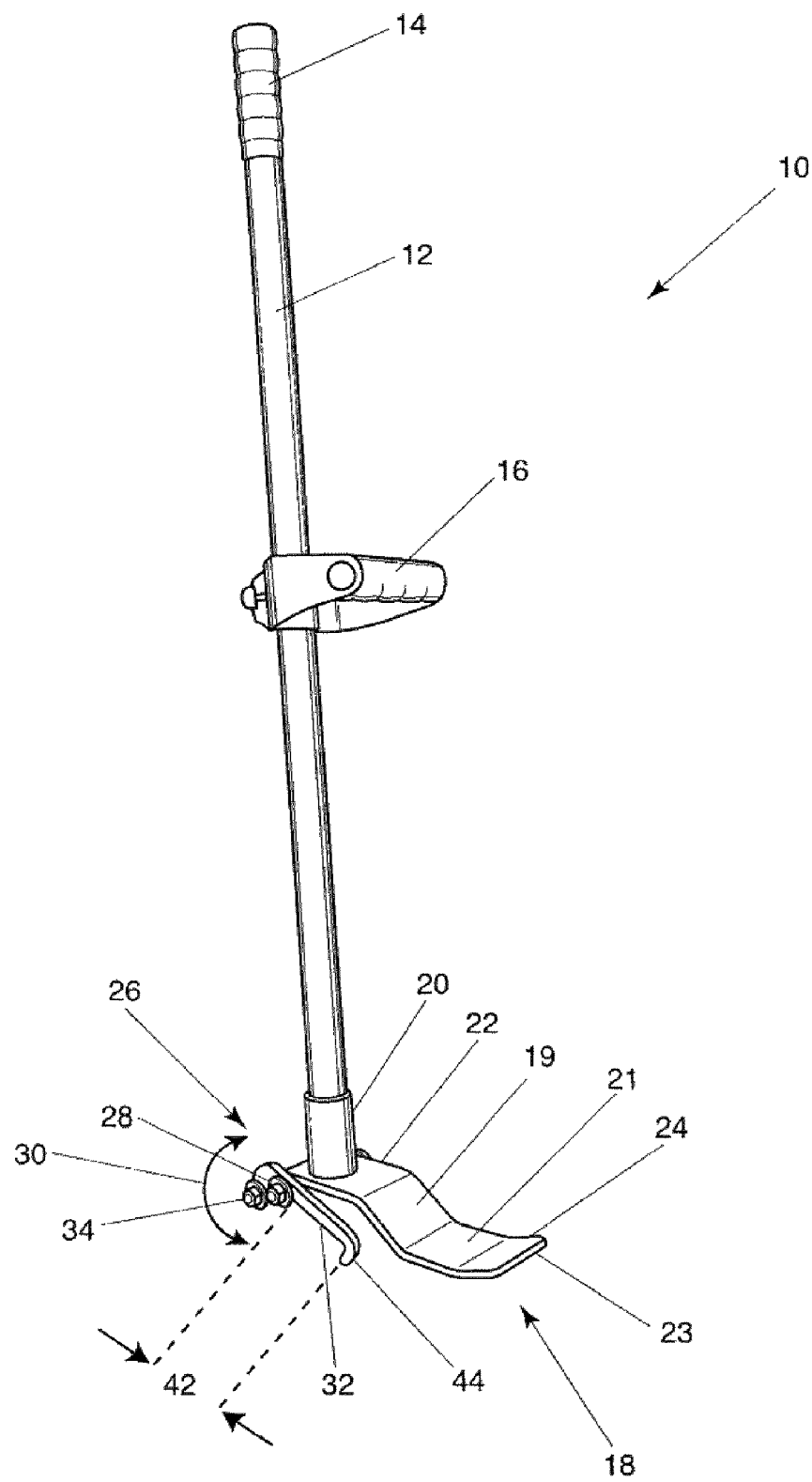
FIG. 2 is a perspective view of the embodiment of FIG. 1.

The presently claimed invention is a unique hand operated tire demount tool along with its method of operation. FIG. 1 is a side view of the hand operated tire demount tool 10 for large truck and trailer tires. FIG. 2 is a perspective view of hand operated tire demount tool 10 of FIG. 1. Referring to FIGS. 1 and 2, hand operated tire demount tool 10 has a handle portion 12 fashioned to offer griping positions along its length. A grip 14 can be placed at a top end of handle portion 12 for added functionality. An adjustable griping member 16 can also be placed anywhere along the length of handle portion 12, depending on the preference of the operator. On the bottom end of handle portion 12 is prying foot assembly 26 with a prying foot 18 placed substantially at a right angle to the handle portion 12. Prying foot 18 can be permanently affixed to handle portion 12 or affixed to a tubular receiving socket 20 which can receive handle portion 12, for modularity. Prying foot 18 is also shaped in a novel way with unique geometric design for large truck and trailer tires. Prying foot 18 has attaching section 22, which attaches to receiving socket 20 at substantially ninety degrees (90°) to handle portion 12. Thereafter, scooping shaped section 24, located at the end of attaching section 22. Scooping shaped section 24 is formed by a sloped section 19, a flat section 21 and an upturned toe section 23. These collective features work to aggressively engage the tire bead at the proper moment of inertia during the demounting procedure, and further provide an optimum mechanical advantage to the user and create a scooping motion for removal of the tire from the wheel assembly. The unique shape of prying foot 18 provides a contour that conforms to the profile shape of most common wheel assemblies and provides for easy insertion of prying foot 18 between the tire bead and the wheel assembly. These differently configured prying foot assemblies 26 can be modularized for versatility and use on different sized wheel assemblies. The dimensions of prying foot 18 can be optimized for use on different sized tires and wheels. Prying foot assembly 26 has a bearing element 28 affixed to bottom of attaching section 22. Bearing element 28, in this embodiment a tubular shape, provides rotational movement 30 for dual rim hooks 32. Dual rim hooks 32 are placed parallel to one another along either side of prying foot 18, as shown. Dual rim hooks 32 are connected to bearing element 28 and prying foot 18 via an axle pivot assembly in bearing element 28, which has a nut, bolt, and washer configuration. Dual rim hooks 32 have a predetermined distance 42 from bearing element 28 and engagement hooks 44. This predetermined distance 42 is necessary to remove the first and second bead from a tire with the same demount tool 10. This will be explained more fully in the discussion below. Disposed on the rear portion of dual rim hooks 32 is heel portion 34 which contacts the face of the rim when demount tool 10 is in operation. Heel portion 34 is preferably made from a material that does not scratch or deface the rim when demount tool 10 is used. Heel portion 34 is affixed to prying foot 18, thus it also swivels or rotates 30, as shown. Heel portion 34 can also be connected to prying foot 18 via a nut, bolt, and washer assembly that spans between dual rim hooks 32.

Figure 3:
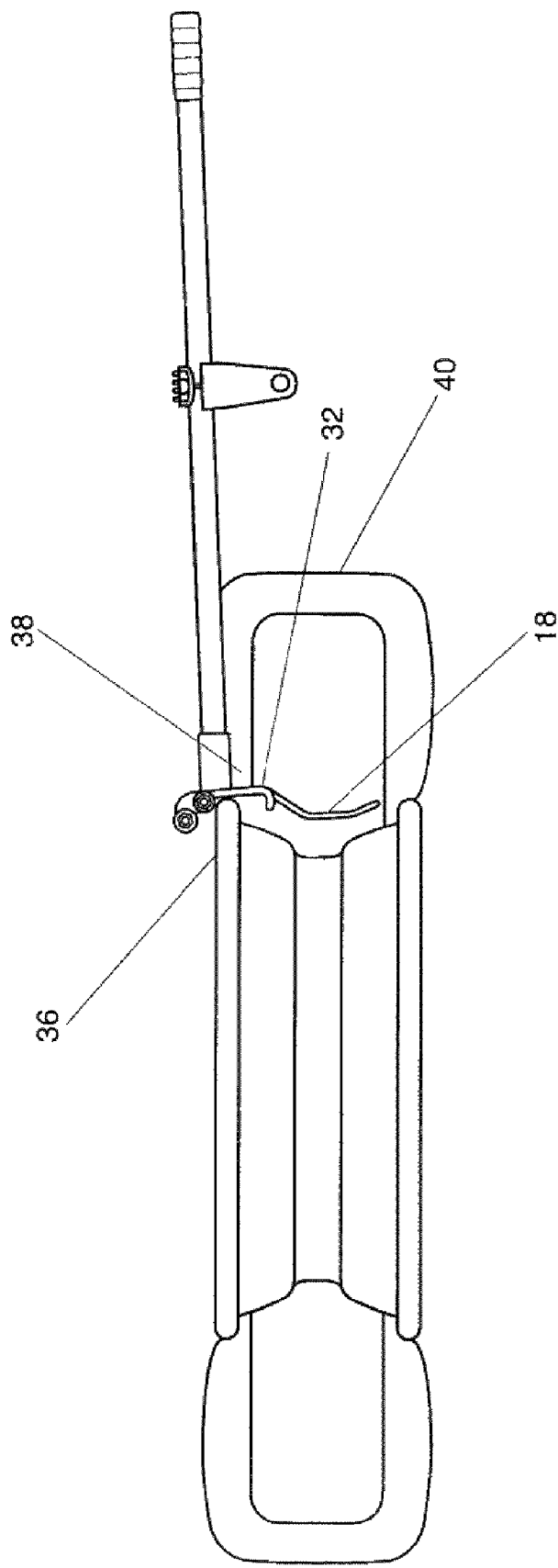
FIG. 3 is a side cut away view of the first embodiment inserted into the first bead.

FIG. 3 is a side cut away view of the hand operated tire demount tool 10 for large truck and trailer tires at the beginning of a demounting operation. Prying foot 18 is inserted between the top of rim flange 36 and first bead 38 of tire 40. Due to the rotational movement of dual rim hooks 32 they are easily positioned to reach below and past the rim flange 36, as shown. Demount tool 10 is now properly inserted, and in a horizontal position for the removal of first bead 38 of tire 40.

Figure 4:
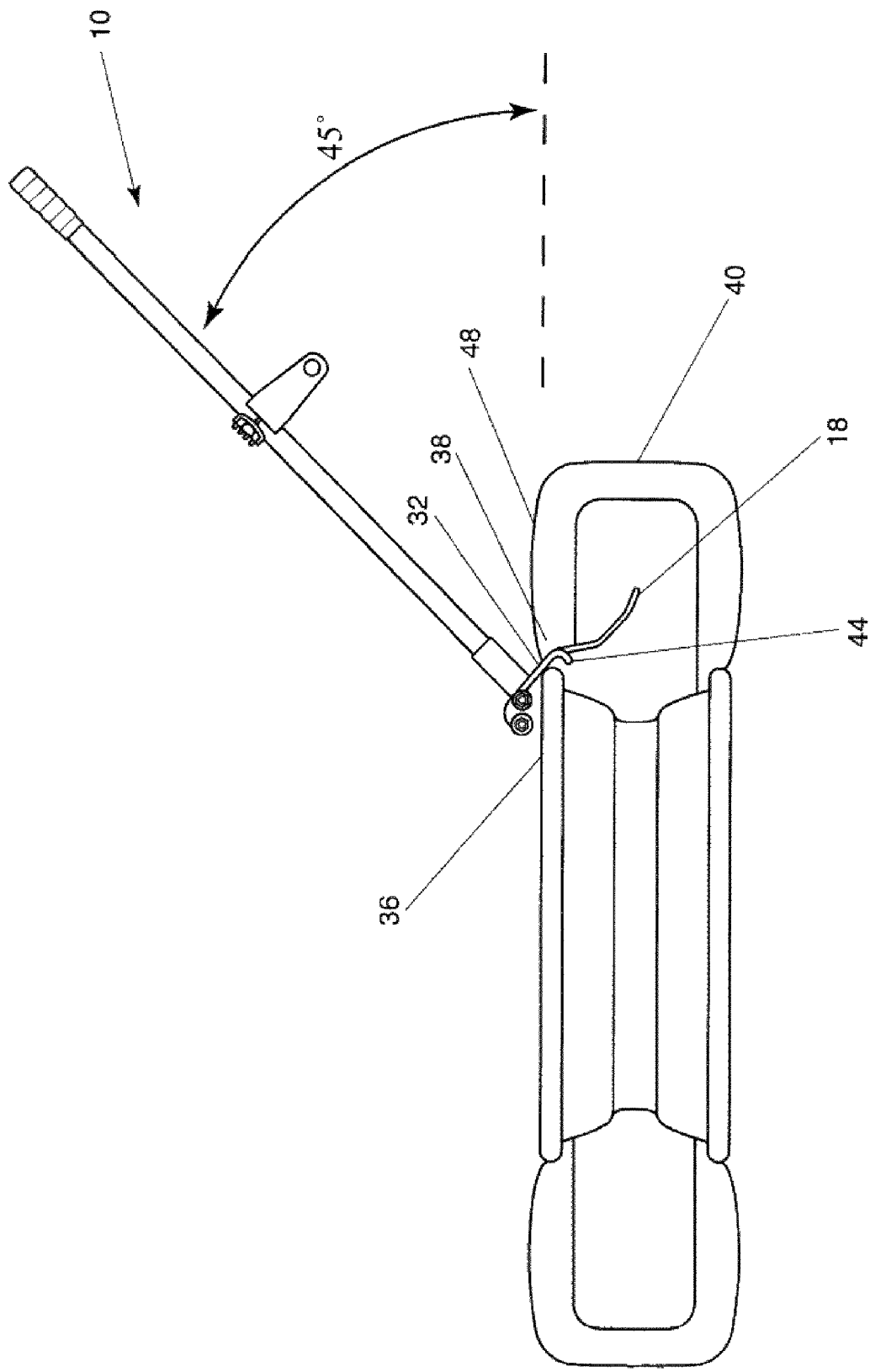
FIG. 4 is a side cut away view of the first embodiment in a forty five degree (45°) working position.

FIG. 4 is a side cut away view of tire demount tool 10 for large truck and trailer tires in the middle stage of operation. Prying foot 18 is pivoted backwards approximately forty-five degrees (45°) towards the center of tire 40 via handle portion 12 being lifted forty-five degrees (45°) toward a vertical orientation. Prying foot 18 begins to apply pressure against first tire bead 38 and the tire side wall 48. This motion effectively lifts first tire bead 38 and tire sidewall 48 off of the topmost rim flange 36. Dual rim hooks 32 begin to engage rim flange 36 on engagement hooks 44 at this stage of operation, providing a secure and stable leverage point.

Figure 5:
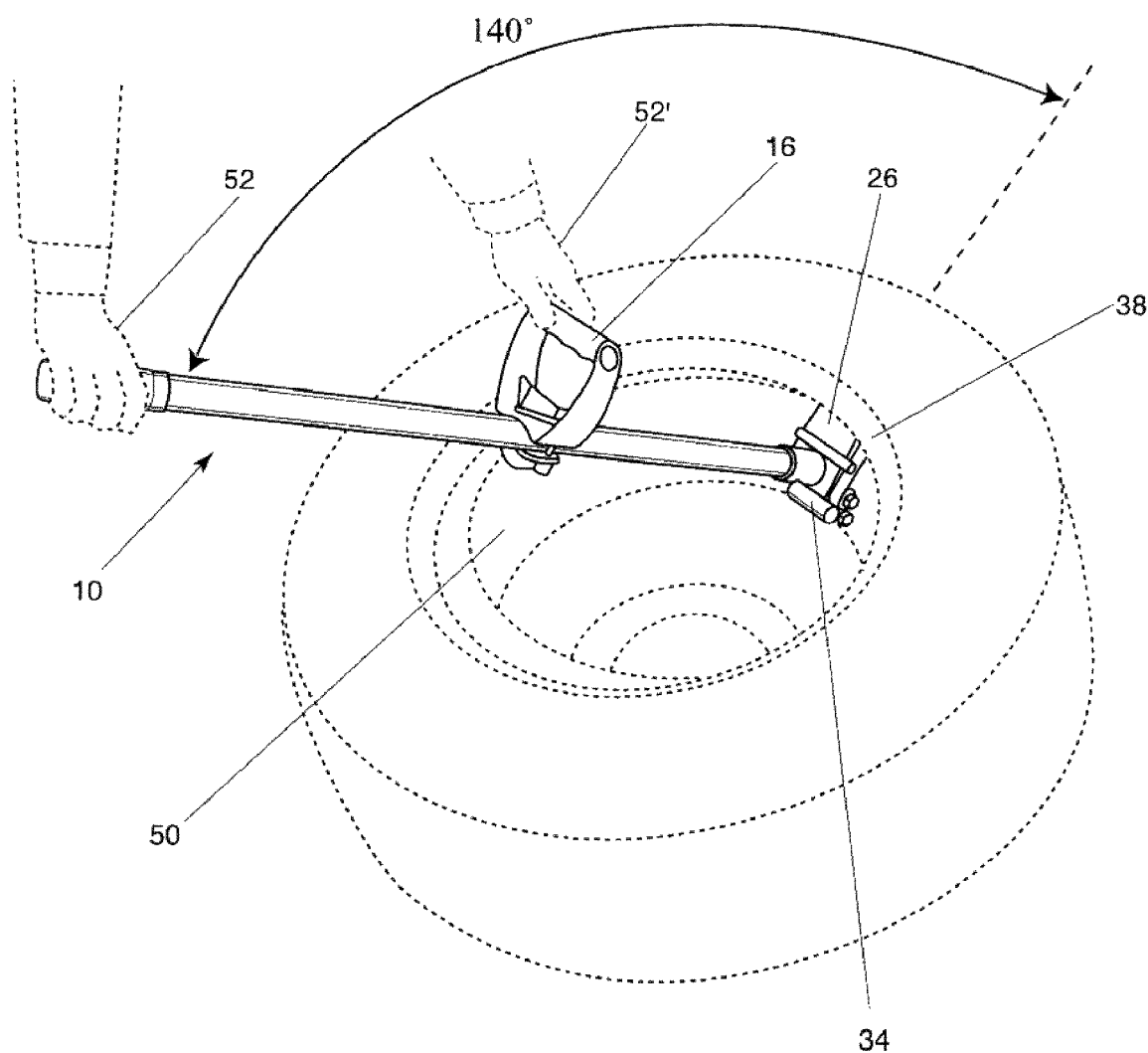
FIG. 5 is a perspective view of the first embodiment showing the removal of the first bead.

FIG. 5 is a perspective view of tire demount tool 10 for large truck and trailer tires in the late stage of operation. Tire demount tool 10 is pivoted backwards approximately one hundred and forty degrees (140°) or enough to remove first tire bead 38 from wheel assembly 50. FIG. 5 further illustrates the operator's hands 52 and 52' positioned for normal use. A first hand 52 engages grip 14 and the second hand 52' holds adjustable gripping member 16 while applying downward pressure. FIG. 5 further illustrates heel portion 34, in this case, a tubular elongated bushing, pressing against wheel assembly 50. This stage of operation effectively removes the entire top tire bead 38 from wheel assembly 50.

Figure 6:
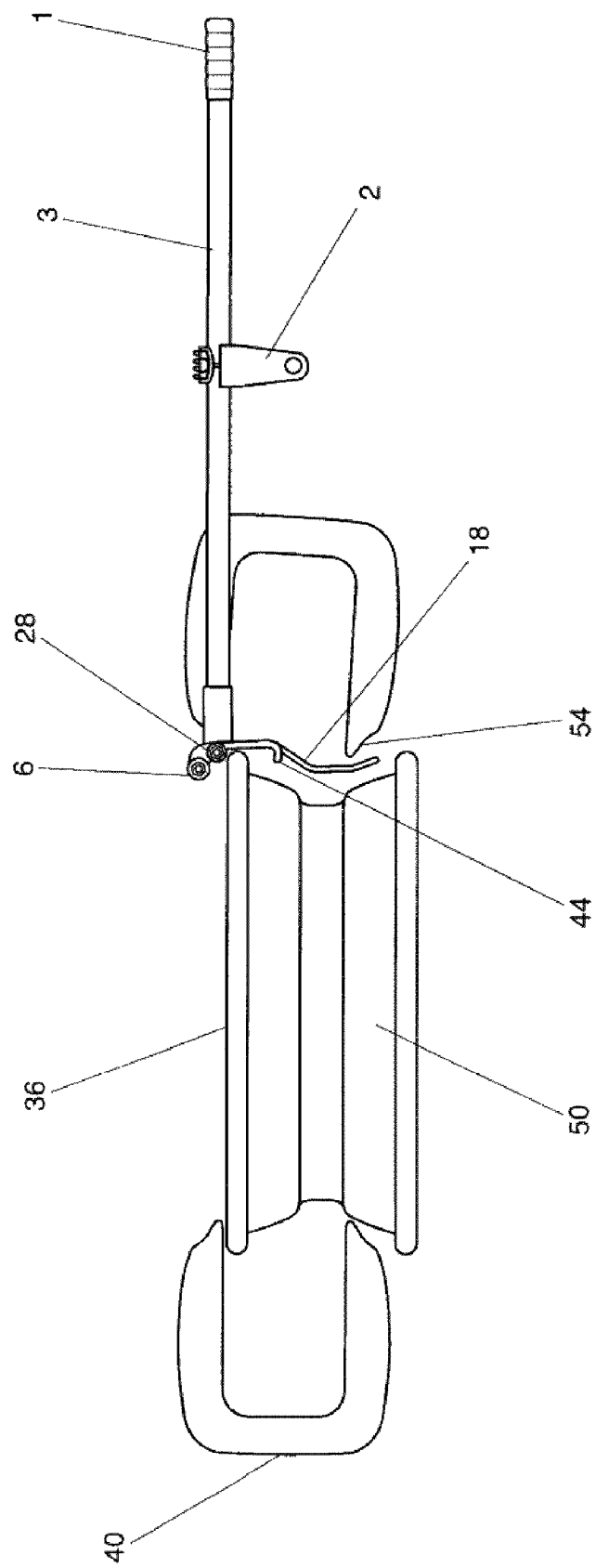
FIG. 6 is a side view of the first embodiment showing insertion of the demount tool into the second bead for removal.

FIG. 6 is a side cutaway view of tire demount tool 10 for large truck and trailer tires in the early stage of operation while removing second tire bead 54. Prying foot 18 is inserted between top rim flange 36 and second or lower tire bead 54 of tire 40. Engagement hooks 44 are positioned so as to reach below and past top rim flange 36. As previously discussed, the predetermined distance 42 or "float" distance of FIG. 2 allows this embodiment of tire demount tool to be used to remove both first bead 38 and second bead 54 with a single tool. Predetermined distance 42 allows the user an additional "float" distance to engage prying foot 18 under second bead 54 when inserting tire demount tool 10 into tire 40. Bearing element 28 provides an end stop when inserting demount tool 10. Again, due to the rotational movement of dual rim hooks 32, this process is easily performed. Tool 10 is now properly inserted, and in position for the removal of second tire bead 54.

Figure 7:
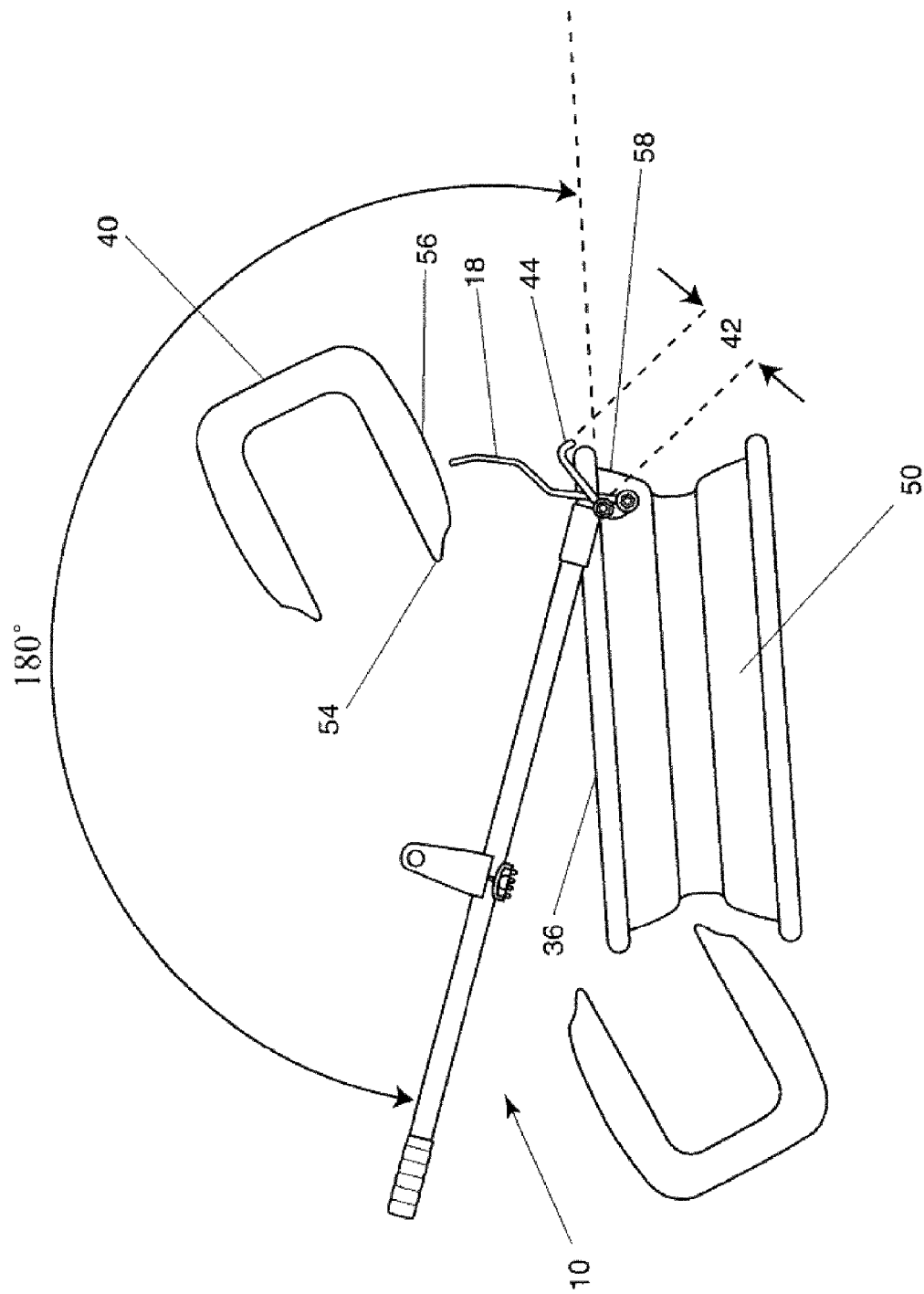
FIG. 7 is a side view of the first embodiment in the final phase of the tire and bead removal from the wheel assembly.

FIG. 7 is a side cutaway view of tire demount tool 10 for large truck and trailer tires in the late stage of operation while removing second tire bead 54. Prying foot 18 is pivoted backwards approximately one hundred and eighty degrees (180°) degrees towards the center of the wheel assembly 50 via handle portion 12 which is being moved at the same angle by an operator holding grip 14 and laterally adjustable gripping member 16. As this process is carried out, rim flange 36 moves along predetermined distance 42 towards engagement hooks 44 finally engaging them. During this process, prying foot 18 begins to apply pressure against second tire bead 54 and the second or lower tire side wall 56. Dual rim hooks 32 engage rim flange 36 on engagement hooks 44 providing a secure prying or leverage position. As this occurs heel portion 34 engages inside wheel flange 58. These components working in unison with one another creates a leveraging motion effectively lifting second tire bead 54 and second tire sidewall 56 off of topmost rim flange 36 successfully and freeing tire 40 from wheel assembly 50.

Figure 8:
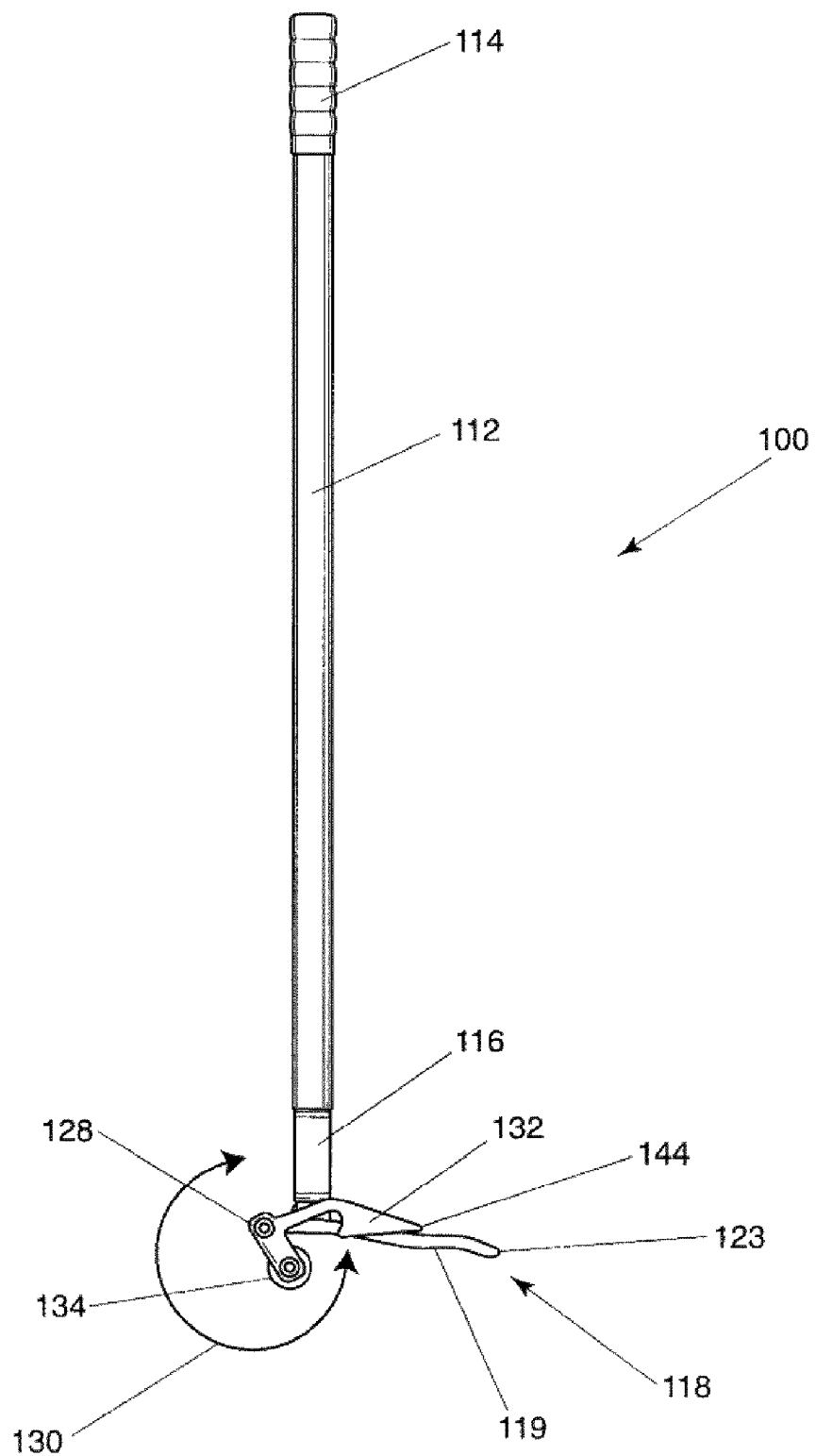
FIG. 8 is a side view of a second embodiment showing the tire demount tool for light truck, trailer, and automotive tires.
Figure 9:
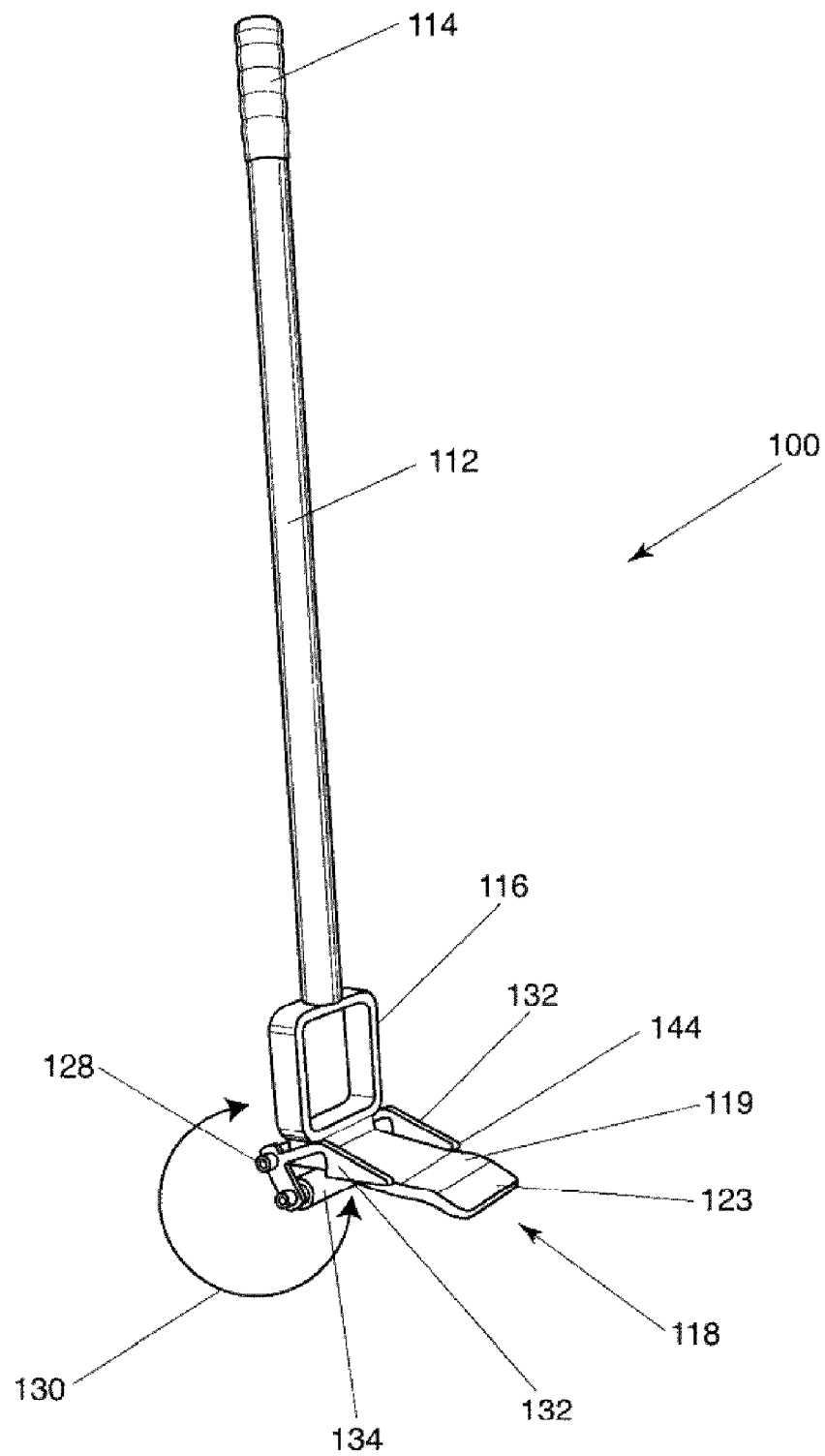
FIG. 9 is a perspective view of the second embodiment shown in FIG. 8.

A second embodiment can be used to remove smaller tires. FIG. 8 is a side view of tire demount tool 100 for light truck, trailer, and automotive tires, while FIG. 9 is a perspective view of the embodiment of FIG. 8. Tire demount tool 100 has a handle portion 112. Handle portion 112 is fashioned to offer griping positions along its length with a grip 114 placed at an end. On the other end of handle portion 112 is affixed a bridging frame 116, which is a boxlike configured member, that allows the spanning of reverse wheel rim centers as better illustrated in FIG. 13. Bridging frame 116 is also a link between handle portion 112 and prying foot 118. Prying foot 118 is also shaped in a novel way with a unique geometric design for light truck, trailer, and automotive tires and is designed for removal of a first bead. Prying foot 118 is contoured to have a slight reverse pitch 119 greater than ninety degrees (90°) in conjunction with handle portion 112. As shown, at the end of prying foot 118 is slightly bulged toe protrusion 123 to aggressively engage the tire bead and sidewall during a demount procedure. Prying foot 118 is further comprised of a bearing element 128 located at the rear of prying foot 118, providing a fulcrum pivot point for rotational movement 130 between prying foot 118 and handle portion 112. Other elements of the second embodiment of tire demount tool 100 are the unique and novel dual rim hooks 132. Dual rim hooks 132 for this second embodiment contain spear shaped engagement hooks 144 at the ends to aid in inserting tire demount tool 100 without causing damage to the tire bead. Prying foot 118 is sandwiched between dual rim hooks 132, rim hooks are placed parallel to one another along either side of the prying foot 118. Dual rim hooks 132 are connected to bearing element 128 and prying foot 118 creating an axle pivot or swivel assembly and affixed via a nut, bolt, and washer configuration. Bearing element 128, in this embodiment is a tubular shape, which provides rotational movement 130 for dual rim hooks 132. Dual rim hooks 132 have a heel portion 134 which extend past bearing element 128. Heel portion 134 is preferably made from a material that does not scratch or deface the rim when demount tool 100 is used. Heel portion 134 is affixed to prying foot 118, thus it also swivels or rotates 30, as shown. Heel portion 134 can also be connected to prying foot 118 via a nut, bolt, and washer assembly that spans between dual rim hooks 132.

Figure 10:
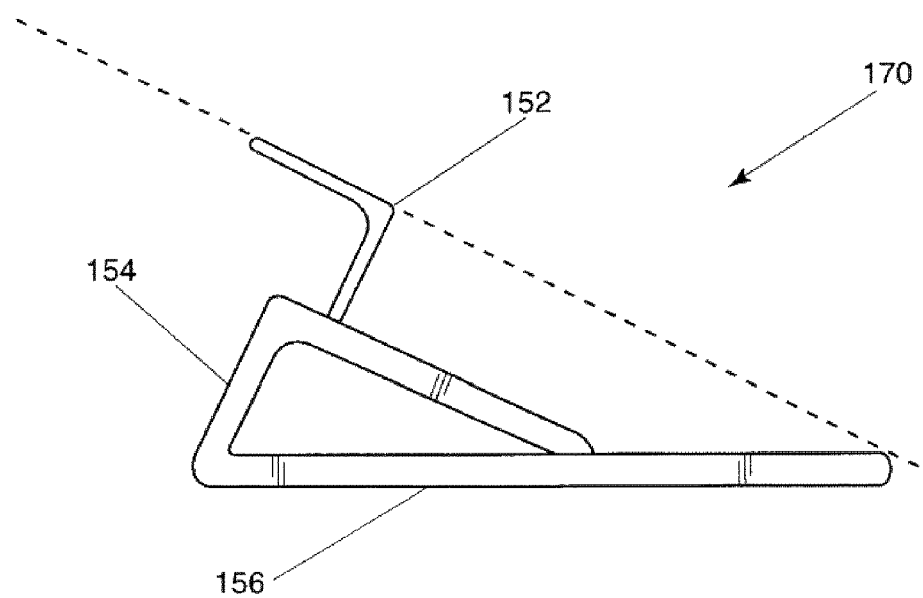
FIG. 10 is a side view of the drop center bead wedge.
Figure 11:
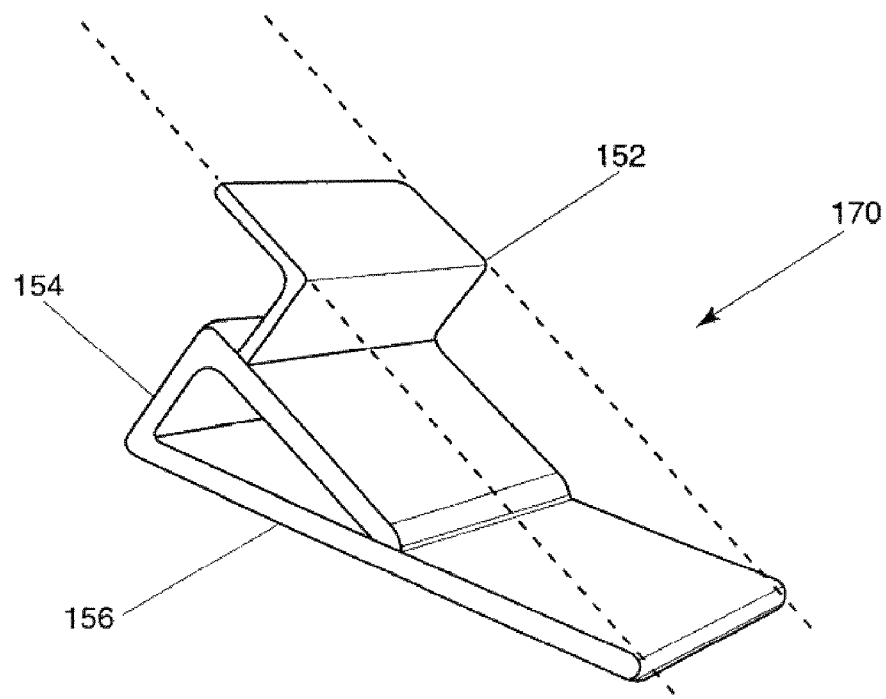
FIG. 11 is a perspective view of the drop center bead wedge.

In order to maintain the position of a tire on a wheel during a demounting procedure and assure the first bead of the tire is in the drop center of a wheel a drop center wedge can be used. This is especially useful in demounting newer tires with stiff sidewalls. FIG. 10 is a side view and FIG. 11 is a perspective view of an embodiment of drop center bead wedge 170. Drop center bead wedge 170 has rim retainer portion 152, a wedge spacer 154 and a side wall skid 156. The function of drop center bead wedge 170 is further illustrated in FIG. 12 and the description therein.

Figure 12:
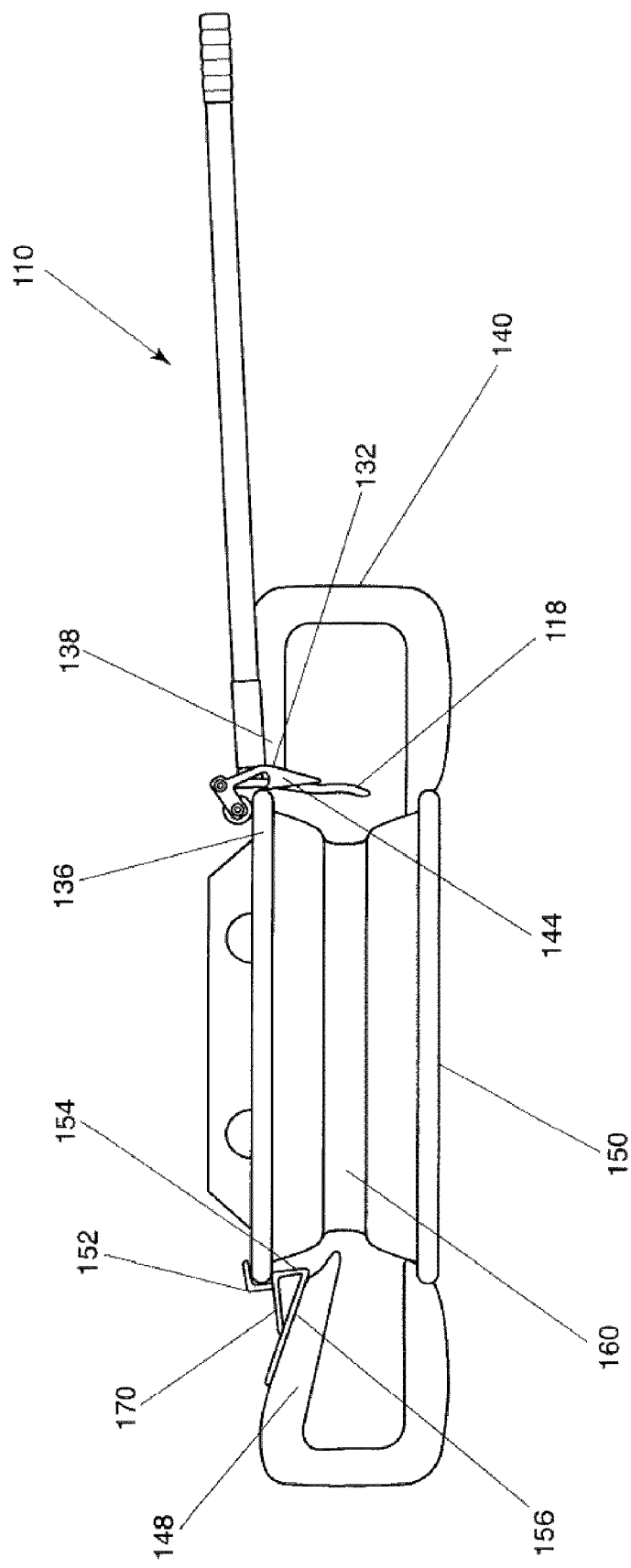
FIG. 12 is a side cut away view of the hand operated tire demount tool for light truck, trailer, and automotive tires inserted into the first bead of the tire and wheel assembly.

FIG. 12 is a side cut away view of the second embodiment of tire demount tool 100 for light truck, trailer, and automotive tires inserted into first bead 138 of tire 140 and wheel assembly 150 in the early stage of operation. Prying foot 118 is inserted between the top of rim flange 136 and first bead 138 of tire 140. Dual rim hooks 132 are positioned to reach below and past rim flange 136 on engagement hooks 144. Tool 100 is now properly inserted and in position for the removal of first bead 138. FIG. 12 further illustrates the use of drop center bead wedge 170 in operation. Drop center bead wedge 170 is secured in place with a downward motion of pressure applied on the top side of rim retainer 152, on an opposite side of tire demount tool 100, as shown. Wedge spacer 154 and side wall skid 156 force first bead 138 and top tire side wall 148 into the drop center 160 of wheel assembly 150 effectively allowing for free movement of first tire bead 138 during the demounting process.

Figure 13:
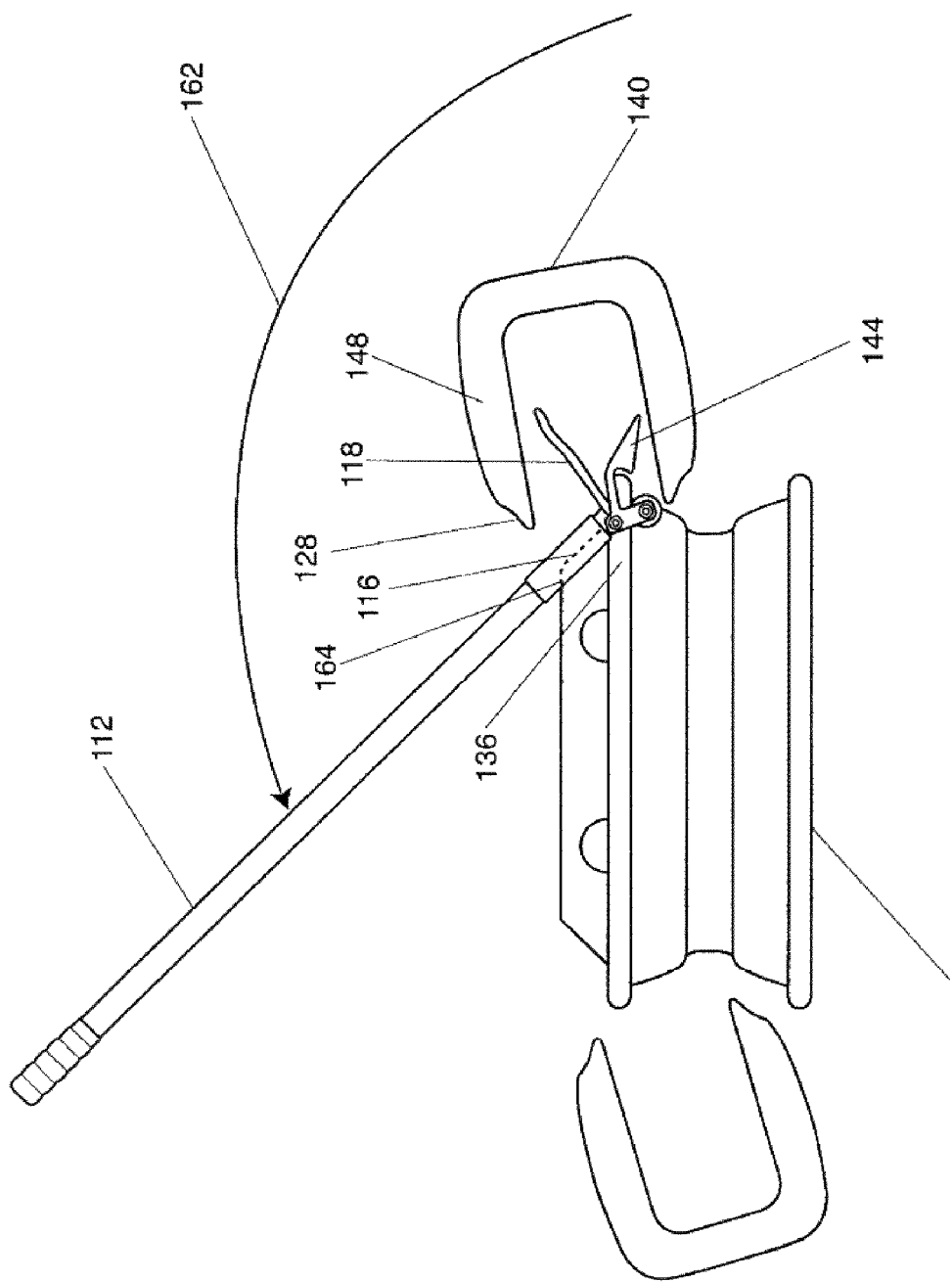
FIG. 13 is a side cut away view of the hand operated tire demount tool for light truck, and automotive tires in the first bead removal position.

FIG. 13 is a side cut away view of the second embodiment of demount tool 100 for light truck, and automotive tires during the removal of first bead 138 from the wheel assembly 150 in the late stage of operation. Prying foot 118 is pivoted backwards or towards the center of the wheel assembly 150 via movement 162 of handle portion 112. Prying foot 118 begins to apply pressure against first tire bead 138 and the tire side wall This motion effectively lifts first tire bead 138 and tire sidewall 148 off of the topmost rim flange 136. Engagement hooks 144 begin to engage rim flange 136, providing a secure and stable leverage point. Bridging frame 116 is configured to allow sufficient movement of handle portion 112 by preventing raised hub 164 from stopping handle portion 112, when this operation is performed. The void in bridging frame 116 envelops raised hub 164.

Figure 14:
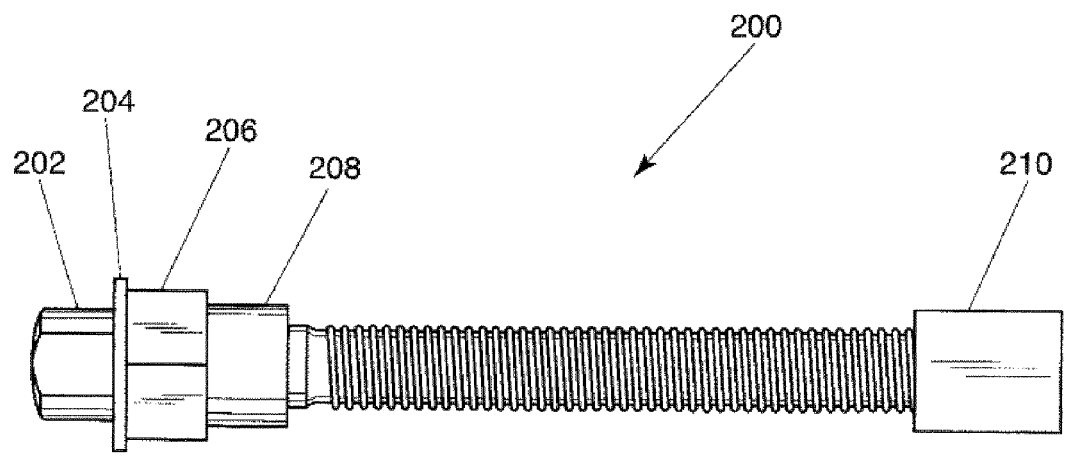
FIG. 14 is a side view of the mechanically retractable tire demount tool.
Figure 15:
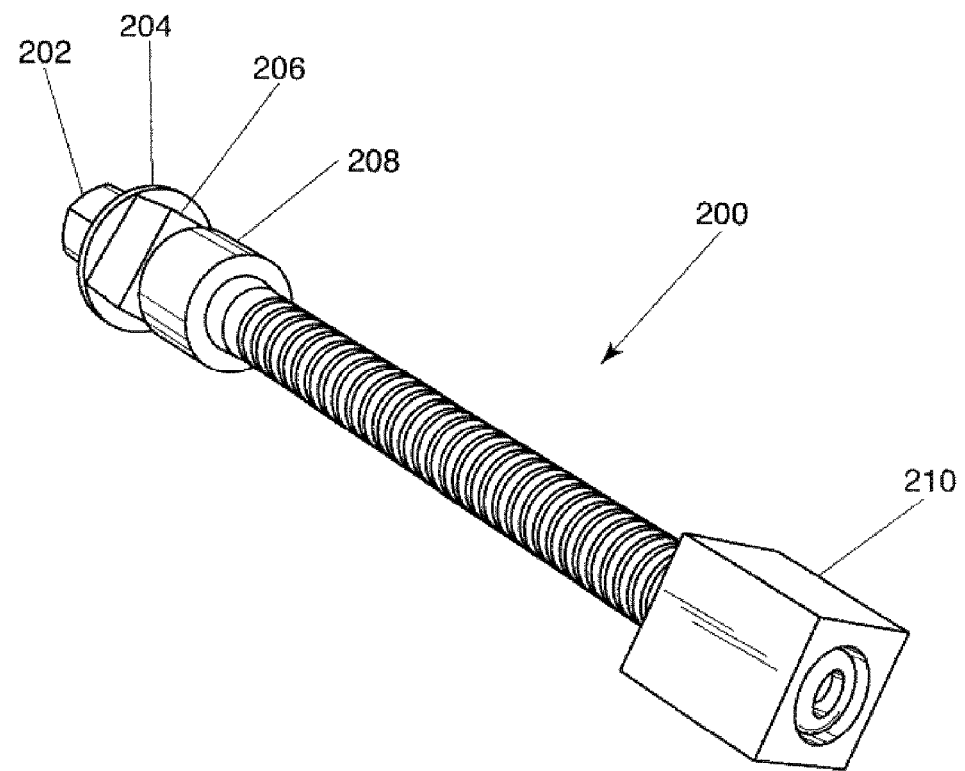
FIG. 15 is a perspective view of the hand operated, mechanically retractable tire demount tool.

FIG. 14 is a side view and FIG. 15 is a perspective view of retractable screw assembly 200 for the mechanically retractable tire demount tool 300. The preferred embodiment of retractable screw assembly 200 consists of a hex head threaded drive bolt 202, a flat washer 204, a square weld-in block bushing 206, a bushing retainer 208, and a weld-in threaded block nut 210. Retractable screw assembly 200 is the drive mechanism for the third embodiment of demount tool 300.

Figure 16:
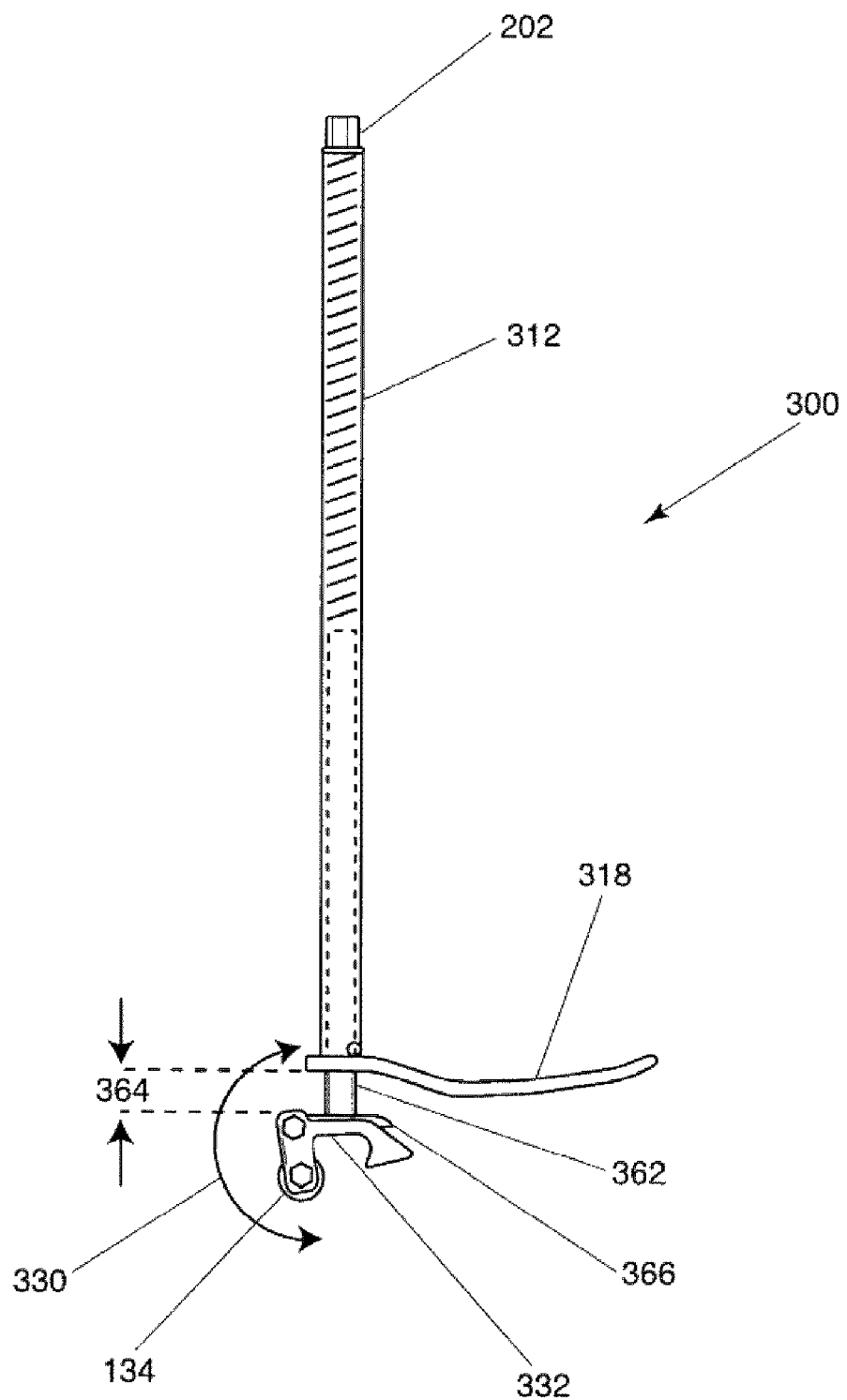
FIG. 16 is a side view of the retractable screw assembly for the mechanically retractable tire demount tool for the second tire bead with the floating swivel hook assembly.
Figure 17:
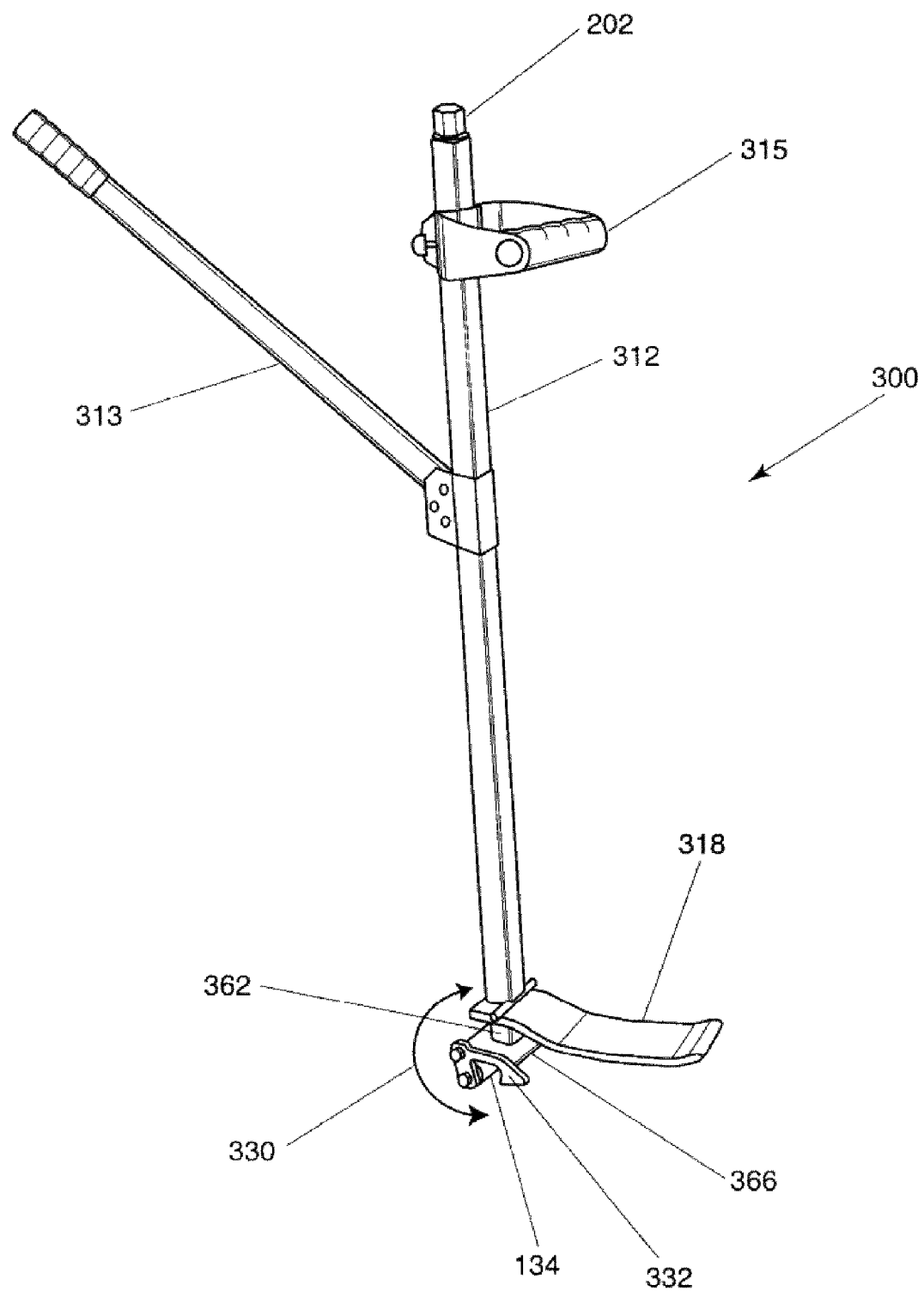
FIG. 17 is a perspective view of the retractable screw assembly for the mechanically retractable tire demount tool for the second tire bead with the floating swivel hook assembly.
Figure 20:
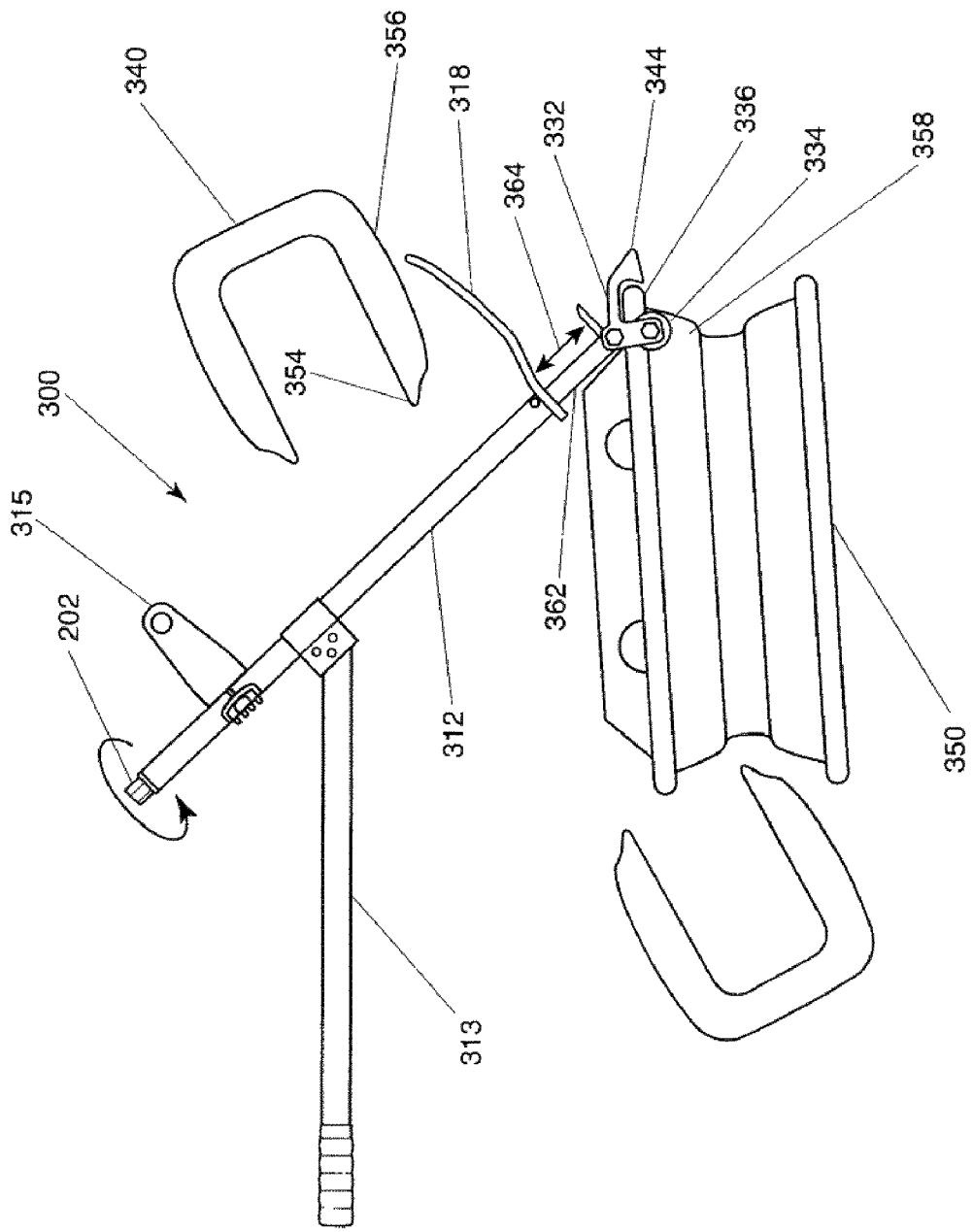
FIG. 20 is a side view of the retractable screw assembly for the mechanically retractable tire demount tool for the second tire bead with the floating swivel hook assembly in the final phase of the tire bead removal from the wheel assembly.

FIG. 16 is a side view and FIG. 17 is a perspective view of a third embodiment of a retractable, tire demount tool 300. This embodiment is useful for the removal of the second or lower bead. These tires tend to be harder to manage and result in tearing or stretching the bead to render the tire useless. The use of this embodiment removes the first bead easily by peeling the bead off with no bead tearing or undue bead stretching, thus, preventing ruining of the tire. Retractable tire demount tool 300 consists of a hollow handle portion 312, connected to a prying foot 318. Retractable screw assembly 200, of FIGS. 14 and 15, is inserted and housed inside the top portion of hollow handle portion 312, opposite prying foot 318. The mating portion of retractable screw assembly 300 is a secondary hollow tube retractable element 362 received into hollow handle portion 312 in a telescoping fashion, to raise and lower 364 dual rim hooks 332 via an aperture on the bottom side of prying foot 318. Secondary hollow tube retractable element 362 is affixed to threaded block nut 210 of FIGS. 14 and 15, and by turning hex head threaded drive bolt 202 causes raising and lowering 364 of dual rim hooks 332 in relation to prying foot 318 in a telescoping fashion. As shown in FIGS. 17 and 20, optional lever arm 313 and adjustable griping member 315 can be affixed to handle portion 312 to multiply the torque to tire demount tool 300. Lever arm 313 is attached permanently or removeably, to and at an approximate forty five degree (45°) angle to handle portion 312.

Lever arm 313 provides the additional torque, and lessens the amount of force to pry the tire from the wheel assembly during a demount procedure. Further, as previously described in the first embodiment, adjustable gripping member 315 can be placed anywhere along handle portion 312 to aid in gripping demount tool 300.

Similar to the other embodiments, this third embodiment has swiveling dual rim hooks 332 that have rotational movement 330 via a bearing element 328, in the figures a tubular bearing. Bearing element 328 is affixed to tubular retractable element 362 via an attached push plate 366. Bearing element 328 provides a pivot/leverage point and place of fastening for dual rim hooks 332. Dual rim hooks 332 are placed parallel to one another along either parallel side of push plate 366. Dual rim hooks 332 are connected to bearing element 328 and push plate 366 via an axle pivot assembly which can have a nut, bolt, and washer configuration. Dual rim hooks 332 further have a heel portion 134 which extends past bearing assembly 328. Heel portion 334 can be connected to one another via of a nut, bolt, and washer assembly.

Figure 18:
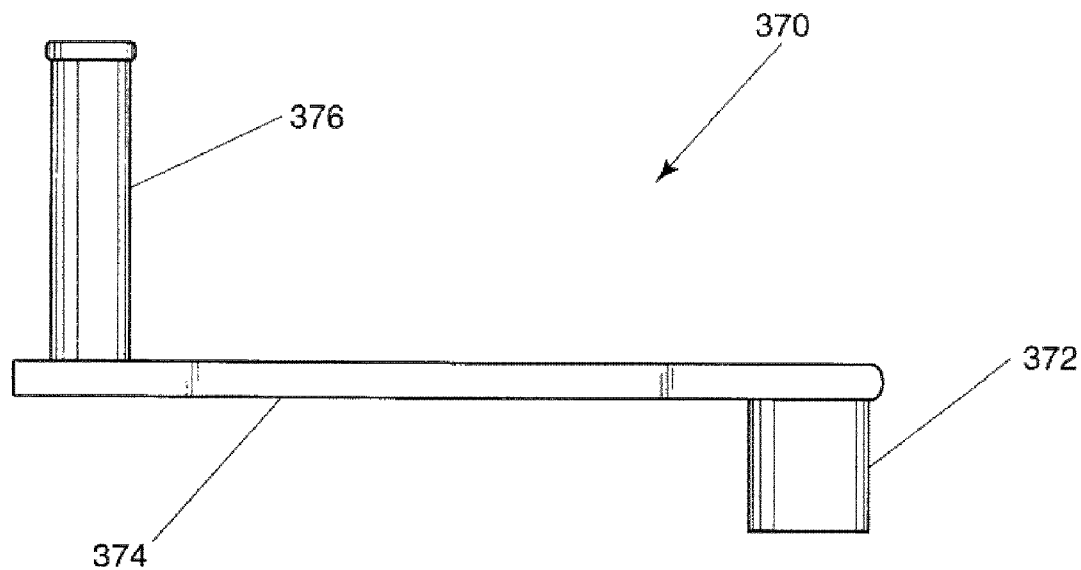
FIG. 18 is a side view of the hand operated socket crank for the mechanically retractable tire demount tool.
Figure 19:
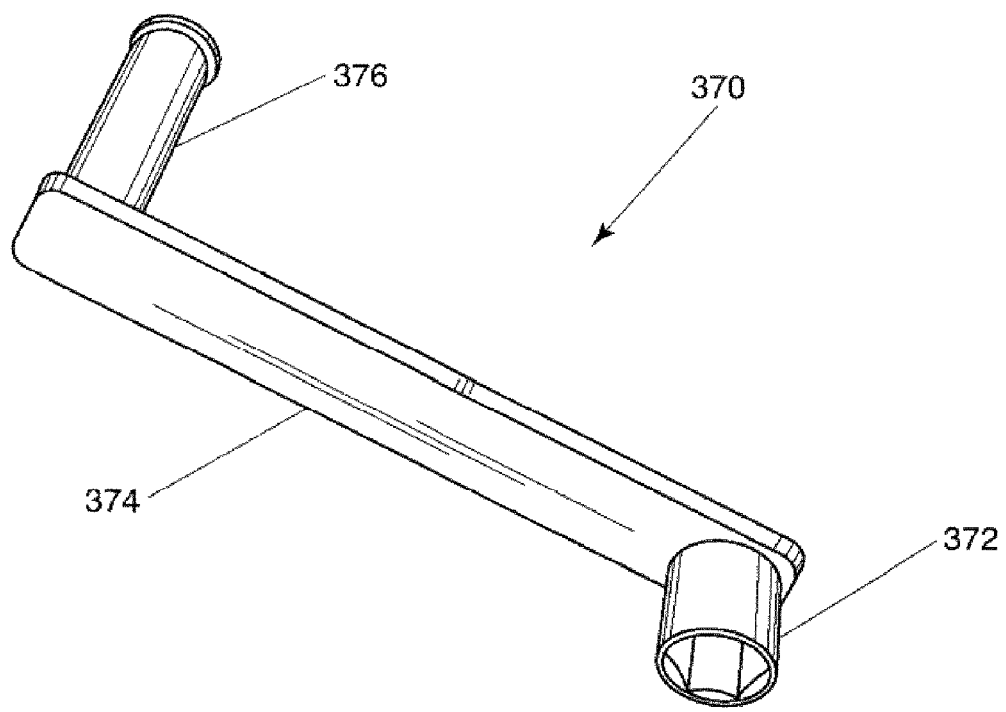
FIG. 19 is a perspective view of the hand operated socket crank for the mechanically retractable tire demount tool.

FIG. 18 and FIG. 19 show a hand operated socket crank 370 for providing the telescoping movement of retractable tire demount tool 300. Hand operated socket crank 370 is made up of a socket 372 to engage the hex head, threaded drive bolt 202 of FIGS. 14 and 15, a crank arm 374 and a crank handle 376.

FIG. 20 is a side cutaway view of the hand operated, mechanically retractable tire demount tool 300 in the final stage of operation for the removal of second tire bead 354 from wheel assembly 350. Prying foot 318 is pivoted backwards towards the center of wheel assembly 350 via hollow handle portion 312. Prying foot 318 begins to apply pressure against second tire bead 354 and lower tire side wall 356. Dual rim hooks 332 engage top rim flange 336 via engagement hooks 344 providing a secure prying or leverage position. As this occurs heel portion 334 engages the inside wheel flange 358. These components work in unison to create a leveraging motion effectively lifting second tire bead 354 and second tire sidewall 356 above the topmost rim flange 336. From this point retractable screw assembly 200 is engaged by rotating hex head threaded drive bolt 202 with hand operated crank 370, pushing against push plate 366 and the secondary tubular retractable element 362 elevating prying foot 318. This provides a raising movement 364 and thereby successfully freeing tire 340 from wheel assembly 350.

Figure 21:
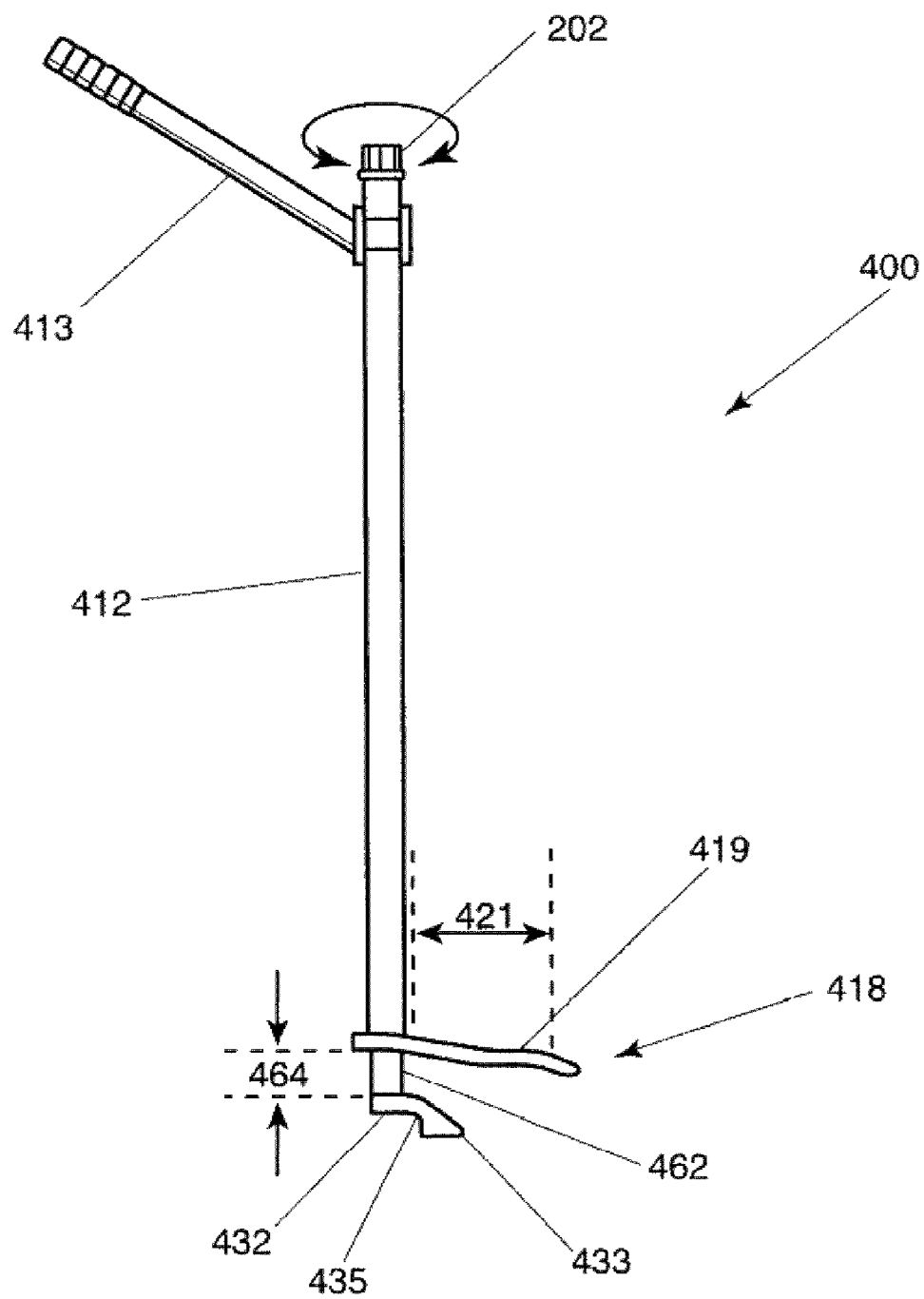
FIG. 21 is a side view of the retractable screw assembly for the mechanically retractable tire demount tool for the first bead with a fixed pivot hook.
Figure 22:
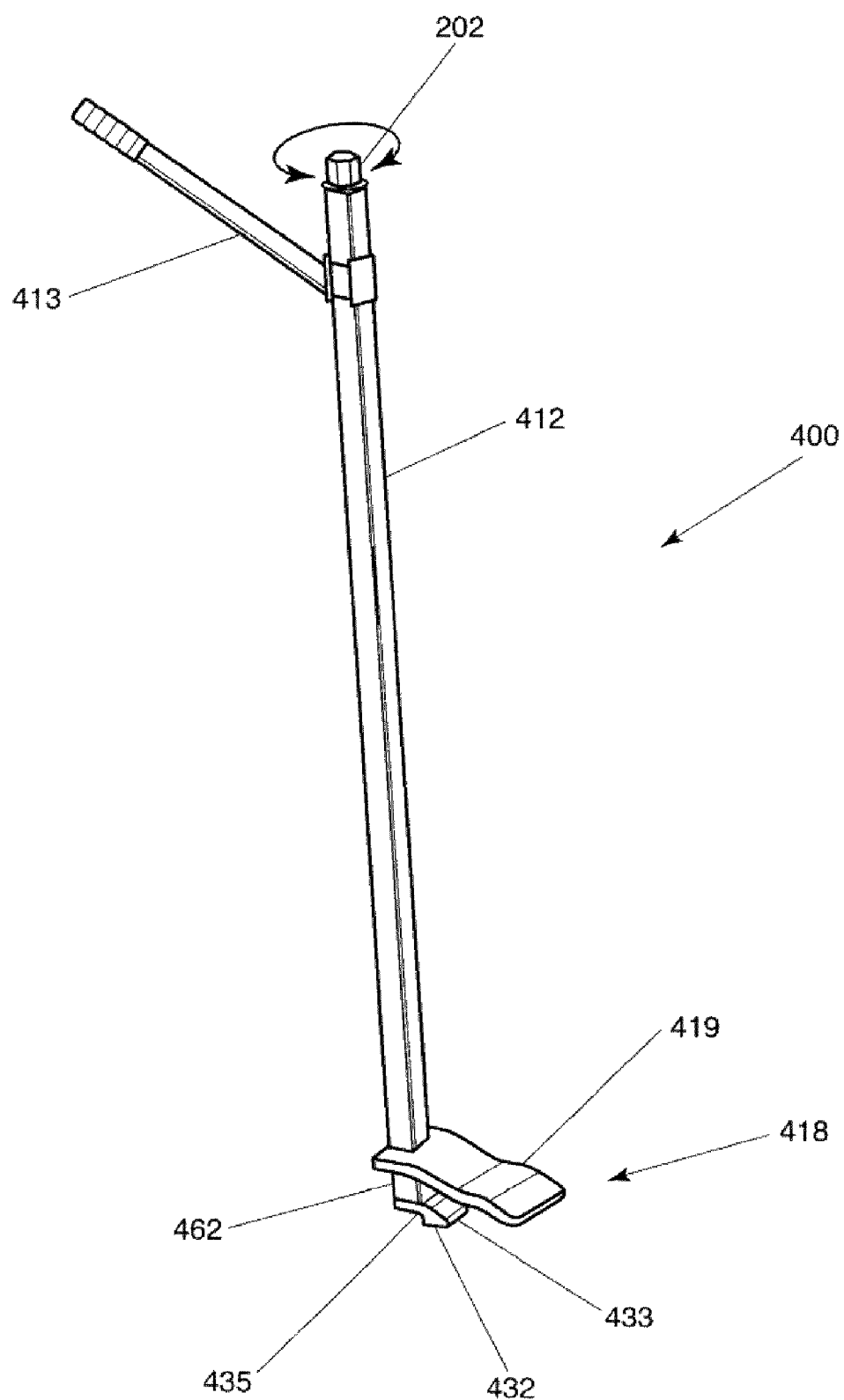
FIG. 22 is a perspective view of the retractable screw assembly for the mechanically retractable tire demount tool for the first bead with a fixed pivot hook.

FIG. 21 is a side view and FIG. 22 is a perspective view of a fourth embodiment of a retractable tire demount tool for the first bead. This embodiment is similar to the third embodiment with use of a telescoping assembly to raise and lower the prying foot in relation to the rim hook; however the configuration of the prying foot and the rim hook are different. Retractable tire demount tool for the first bead 400 has a hollow handle portion 412, connected to a shortened prying foot 418. As is shown in FIGS. 14 and 15 the retractable screw assembly is inserted and housed inside the top portion of hollow handle portion 412, opposite shortened prying foot 418. The mating portion of the retractable tire demount tool for first bead 400 is a secondary hollow tube retractable element 462 received into hollow handle portion 412 in a telescoping fashion, to raise and lower 464 fixed pivot rim hook 432 in relation to shortened prying foot 418. As shown, at the end of shortened prying foot 418 has a slightly bulged toe protrusion or uplifted portion 419 to aggressively engage the tire bead and sidewall during a demount procedure. Shortened prying foot 418 is so named because foot length 421 is optimized for insertion of shortened prying foot 418 between the wheel and the tire to engage the first bead, as described below. Foot length 421 can be altered for differing sized wheel assemblies. Secondary hollow tube retractable element 462 is raised and lowered as shown in FIGS. 14 and 15, and by turning hex head threaded drive bolt 202 which causes raising and lowering 464 of fixed pivot rim hook 432 in relation to shortened prying foot 418 in a telescoping fashion. Optional lever arm 413 can be affixed to handle portion 412 to multiply the torque to retractable tire demount tool for first bead 400. Lever arm 413 can be attached permanently or removably, preferably at an approximate forty five degree (45°) angle to handle portion 412. Lever arm 413 provides the additional torque, and lessens the amount of force to cam demount tool 400 from the wheel assembly during a demount procedure.

This fourth embodiment retractable tire demount tool for first bead 400 has a fixed pivot rim hook 432. Fixed pivot rim hook 432 provides a fixed position by which to cam the tool over providing an optimum point by which to engage the retractable drive bolt 202 and thereby remove the tire from the wheel assembly. Fixed pivot hook 432 is a "J" shaped member 435 on the inner portion for engaging and securing the rim flange when the telescoping function is engaged. Fixed pivot hook 432 has a spear shaped configuration 433 to aid in inserting it between the tire bead and the wheel assembly.

Figure 23:
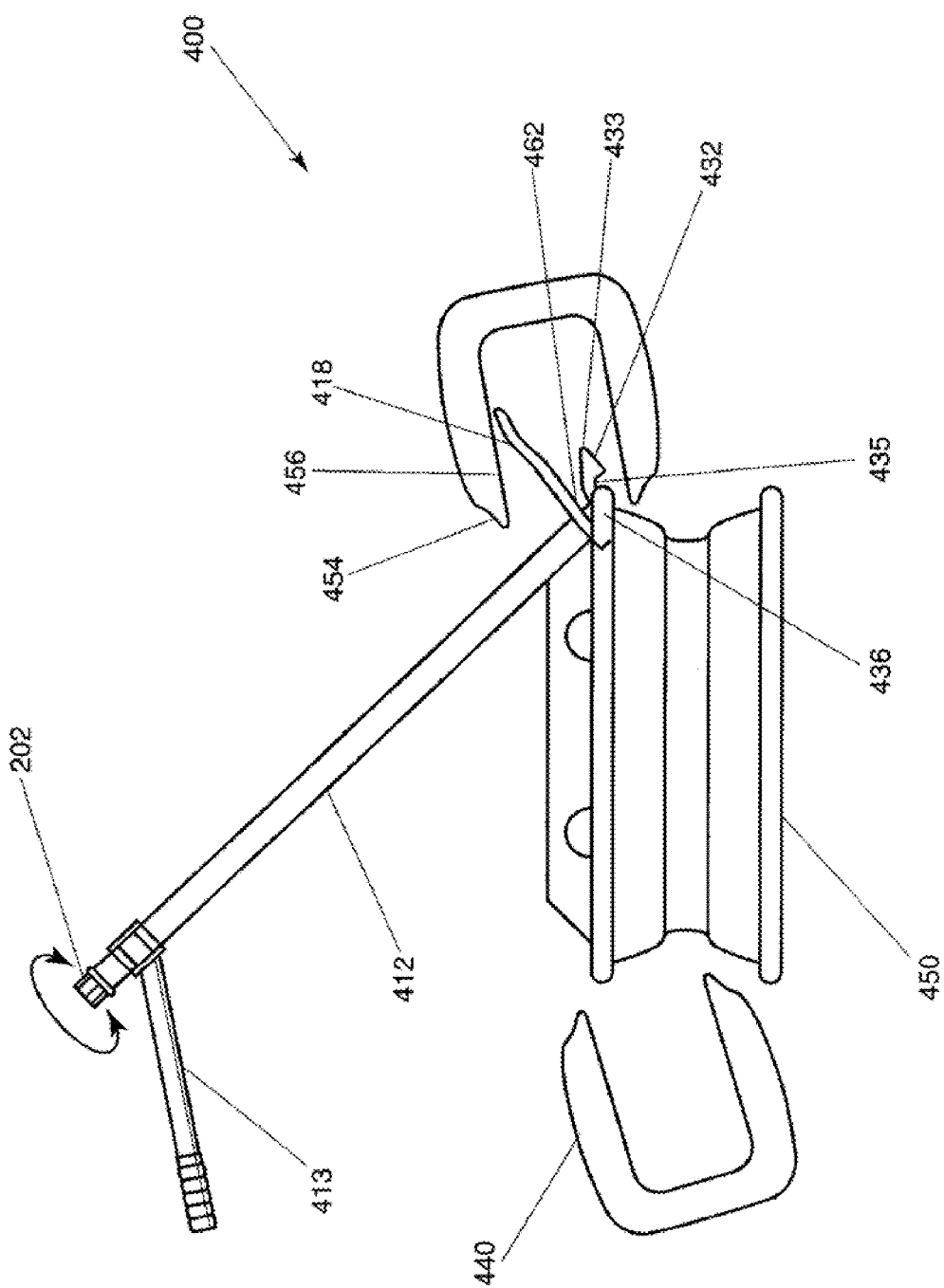
FIG. 23 is a side view of the retractable screw assembly for the mechanically retractable tire demount tool for the first bead with a fixed pivot hook in the final phase of the tire bead removal from the wheel assembly.

As in the aforementioned embodiments, demount tool 400 is inserted between rim or wheel assembly 450 and tire 440 by inserting shortened prying foot 418 into the interior of tire onto upper tire side wall 456 and engaging the same. Fixed pivot foot 432 is hooked to rim flange 426 by engaging "J" shaped member 435, as shown, thus readying the demount procedure. Fixed pivot foot 432 can have a spear shaped configuration 433 to aid in the insertion procedure. FIG. 23 is a side cutaway view of hand operated, mechanically retractable tire demount tool 400 in the final stage of operation for the removal of first tire bead 454 from wheel assembly 450. Shortened prying foot 418 is pivoted backwards towards the center of wheel assembly 450 via hollow handle portion 412. Shortened prying foot 418 begins to apply pressure against first tire bead 454 and upper tire side wall 456. Fixed pivot rim hook 432 engages top rim flange 436, providing a secure prying or leverage position. These components work in unison to create a leveraging motion effectively lifting first tire bead 454 and first tire sidewall 456 above rim flange 436. Retractable screw assembly 200 is engaged by rotating hex head threaded drive bolt 202 with a hand operated crank or power tool, pushing against the fixed pivot rim hook 432 and the secondary tubular retractable element 462, thereby elevating the shortened prying foot 418. This provides a raising movement 464 as shown in FIG. 21, thereby successfully freeing tire 440 from wheel assembly 450.

Figure 24:
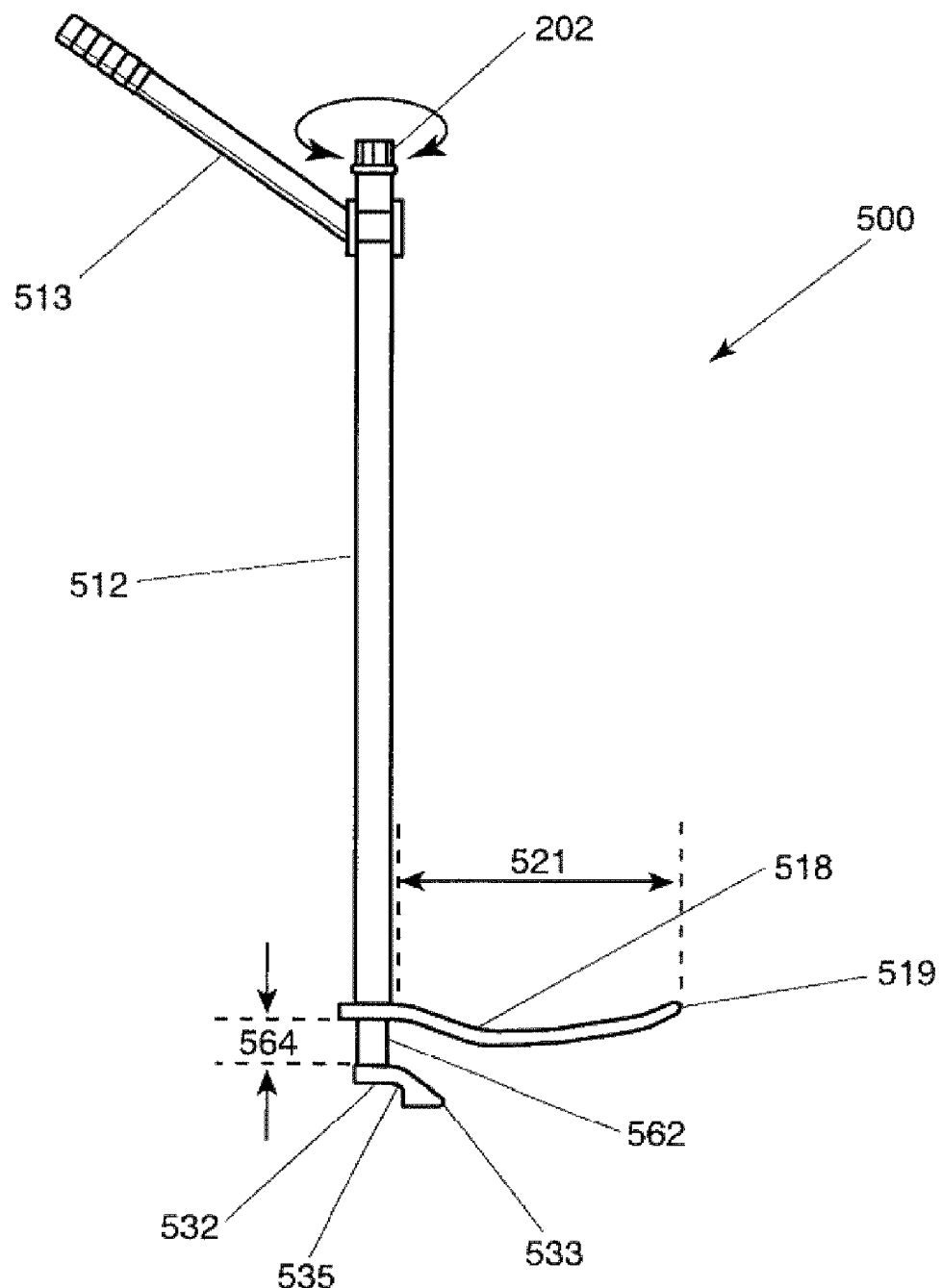
FIG. 24 is a side view of the retractable screw assembly for the mechanically retractable tire demount tool for the second bead with a fixed pivot hook.
Figure 25:
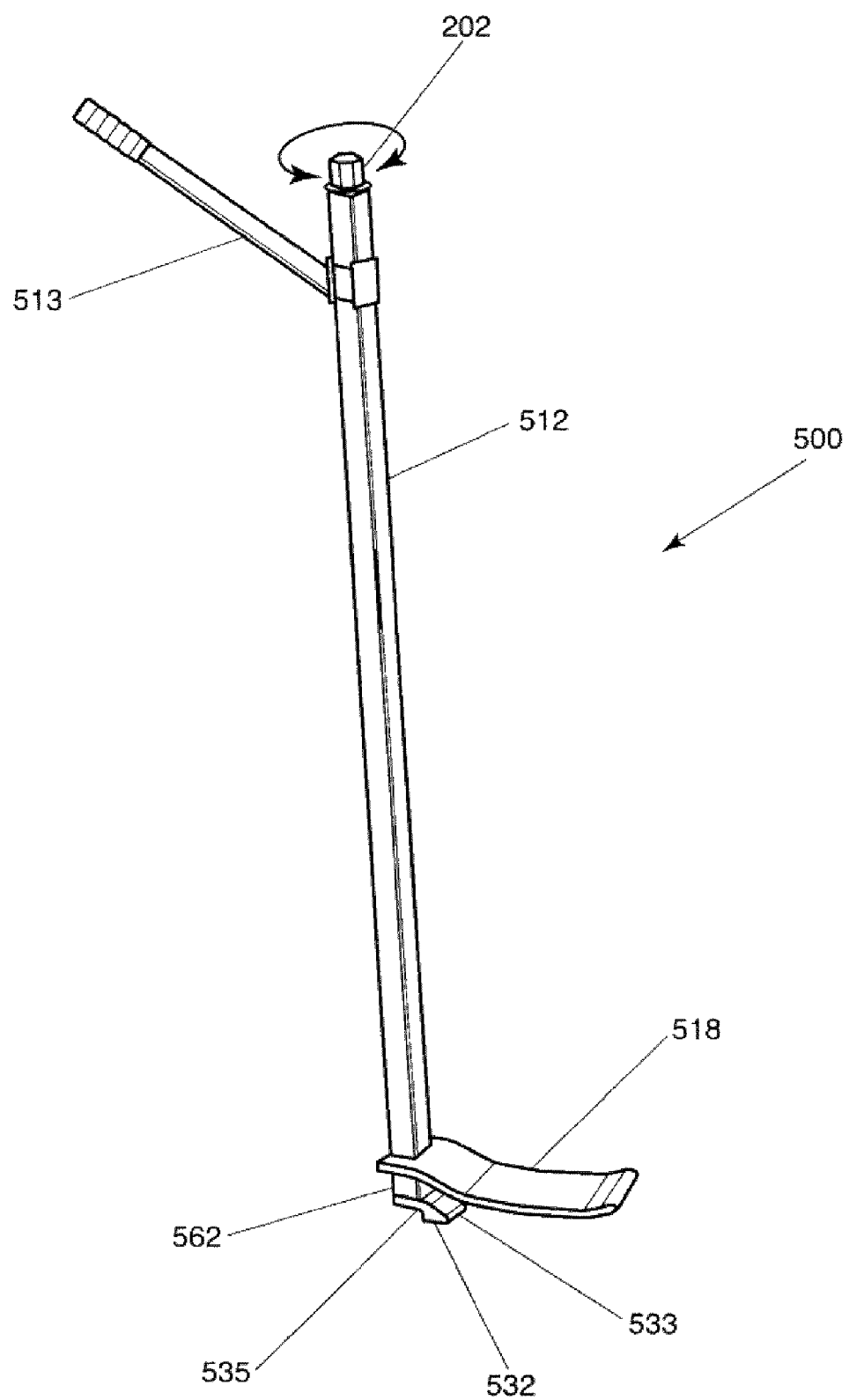
FIG. 25 is a perspective view of the retractable screw assembly for the mechanically retractable tire demount tool for the second bead with a fixed pivot hook.

FIGS. 24 and 25 show a fifth embodiment of a retractable tire demount tool for the removal of a second bead. This embodiment is similar to the embodiment shown in FIGS. 21 through 23; however the configuration of the prying foot is different. Retractable tire demount tool for the second bead 500 has of a hollow handle portion 512, connected to a lengthened prying foot 518. As shown, at the end of lengthened prying foot 518 has a slightly bulged toe protrusion or uplifted portion 519 to aggressively engage the second tire bead and sidewall during a demount procedure. Lengthened prying foot 518 is so named because foot length 521 is optimized for insertion of lengthened prying foot 518 between the wheel and the tire to engage the second bead and is considerably longer that shortened prying foot 418, as described below. Foot length 521 can be altered for differing sized wheel assemblies; however foot length 521 should preferably be at least as wide as the wheel assembly. The retractable screw assembly as previously described in FIGS. 14 and 15 is inserted and housed inside the top portion of hollow handle portion 512, opposite lengthened prying foot 518. The mating portion of retractable tire demount tool for the second bead 500 is a secondary hollow tube retractable element 562 received into hollow handle portion 512 in a telescoping fashion, to raise and lower 564 fixed pivot rim hook 532 in relation to lengthened prying foot 518. Secondary hollow tube retractable element 562 is affixed to threaded block nut as described in FIGS. 14 and 15 and by turning hex head threaded drive bolt 202, causes raising and lowering 564 of fixed pivot rim hook 532 in relation to the lengthened prying foot 518 in a telescoping fashion. Optional lever arm 513 can be affixed to handle portion 512 to multiply the torque to retractable tire demount tool for the second bead 500. Lever arm 513 is attached permanently or removably, at an approximate forty five degree (45°) angle to handle portion 512. Lever arm 513 provides the additional torque, and lessens the amount of force to cam demount tool for second tire bead 500 the wheel assembly during a demount procedure.

This fifth embodiment of the retractable tire demount tool for the second bead 500 has a fixed pivot rim hook 532 that is similarly "J" configured 535 on the inner portion, as in the previous embodiment. Further fixed pivot hook 532 can have a spear shaped member 533 to aid in the insertion of it between the wheel assembly and the second bead of the tire. Fixed pivot rim hook 532 provides a fixed position by which to cam the tool over providing an optimum point by which to engage the retractable drive bolt 202 and thereby remove the tire from the wheel assembly.

Figure 26:
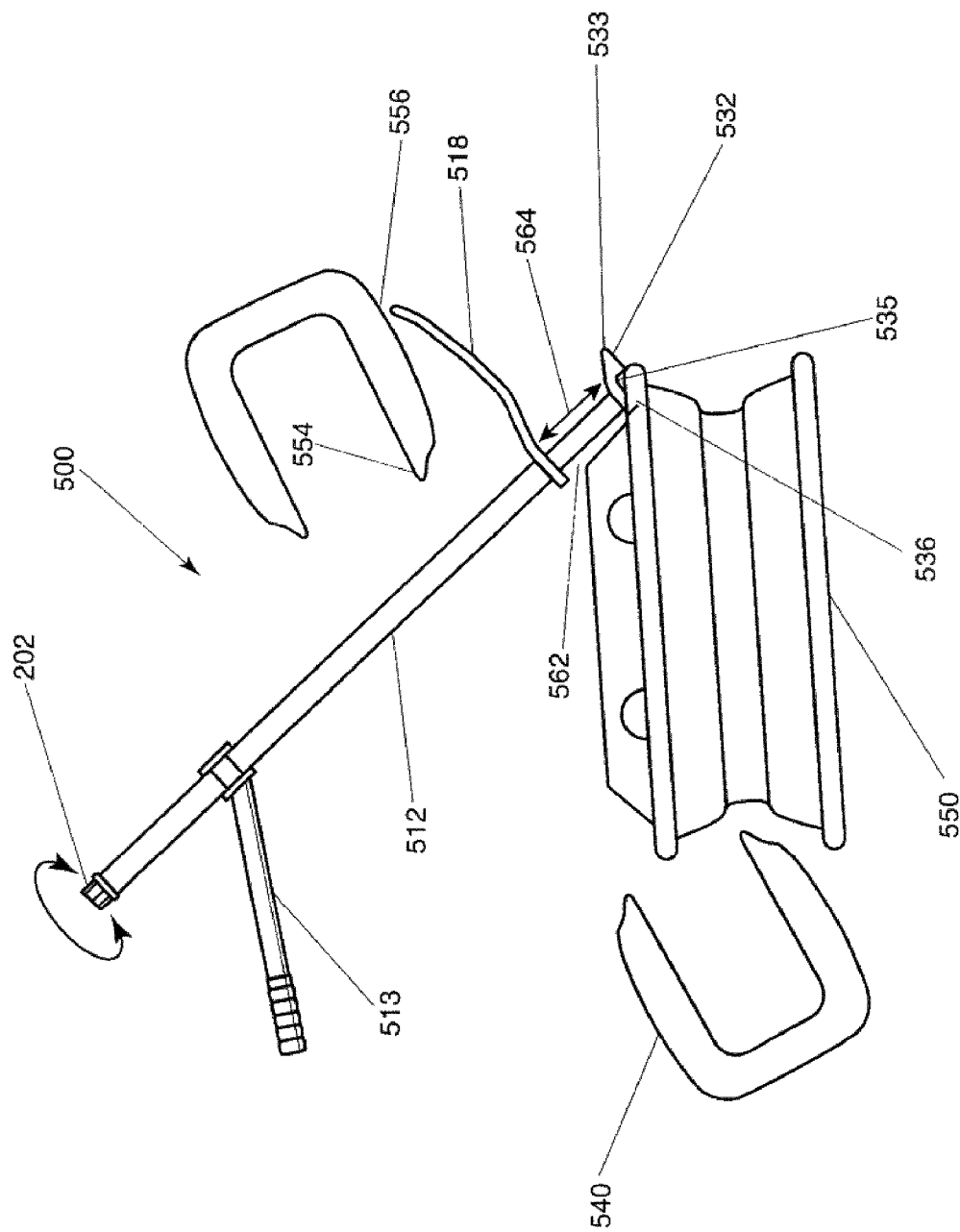
FIG. 26 is a side view of the retractable screw assembly for the mechanically retractable tire demount tool for the second bead with a fixed pivot hook in the final phase of the tire bead removal from the wheel assembly.

FIG. 26 is a side cutaway view of hand operated, mechanically retractable tire demount tool 500 in the final stage of operation for the removal of second tire bead 554 from wheel assembly 550. As in the aforementioned embodiments, demount tool 500 is inserted between rim or wheel assembly 550 and tire 540 by inserting lengthened prying foot 518 to the exterior of tire onto lower tire side wall 556 and engaging the same. Fixed pivot foot 532 is hooked to rim flange 536 by engaging "J" shaped member 535 to rim flange 536, thus readying the demount procedure. Providing a spear shape 533 to fixed pivot foot 532 aids in this procedure. Lengthened prying foot 518 is pivoted backwards towards the center of wheel assembly 550 via hollow handle portion 512. Lengthened prying foot 518 begins to apply pressure against second tire bead 554 and lower tire side wall 556. Fixed pivot rim hook 532 engages top rim flange 536 providing a secure prying or leverage position. These components work in unison to create a leveraging motion effectively lifting second tire bead 554 and second tire sidewall 556 above rim flange 536. From this point retractable screw assembly 200 is engaged by rotating hex head threaded drive bolt 202 with a hand operated crank or power tool, pushing against fixed pivot rim hook 532 and secondary tubular retractable element 562 elevating lengthened prying foot 518. This provides a raising movement 564 and thereby successfully freeing tire 540 from wheel assembly 550.

Although the invention has been described in detail with particular reference to these preferred embodiments, other embodiments can achieve the same results. Variations and modifications of the presently claimed invention will be obvious to those skilled in the art and it is intended to cover in the appended claims all such modifications and equivalents. The entire disclosures of all references, applications, patents, and publications cited above, are hereby incorporated by reference.

What is claimed is:

1. A tool for demounting a first and a second bead of a tire from a wheel assembly, the tool comprising:

a prying foot affixed to a handle, said prying foot comprising a predetermined length, said prying foot comprising a scooping portion for pulling an inside portion of the first bead or a bottom portion of the second bead of the tire over a rim flange;

a fixed hook assembly for hooking the rim flange of the wheel assembly; and a telescoping assembly for raising and lowering the prying foot in relation to the fixed hook assembly to peel the first or second bead of the tire from the wheel assembly.

2. The tool of claim 1 wherein the predetermined length comprises a length to engage the first bead when inserted between the tire and the wheel assembly.

3. The tool of claim 2 wherein the predetermined length comprises a short foot.

4. The tool of claim 1 wherein the predetermined length comprises a length to engage the second bead when inserted between the tire and the wheel assembly.

5. The tool of claim 4 wherein the predetermined length comprises a long foot.

6. The tool of claim 1 wherein the prying foot is affixed at substantially a right angle to the handle.

7. The tool of claim 1 wherein the handle comprises a predetermined length to provide leverage to the first and the second bead.

8. The tool of claim 1 wherein the hook assembly comprises a "J" shaped configuration on an inner portion and a spear configuration on an outer portion.

9. The tool of claim 1 wherein the hook assembly comprises a configuration for continually engaging the rim flange when an angle of the handle in relation to the wheel assembly is changed.

10. The tool of claim 1 wherein the fixed hook assembly comprises a configuration to provide a pivot point between the wheel assembly and the handle.

11. The tool of claim 1 wherein the telescoping assembly comprises the handle comprising a hollow member and a retractable member disposed inside the hollow member.

12. The tool of claim 11 wherein the telescoping assembly comprises a linear movement assembly.

13. The tool assembly of claim 1 further comprising a lever arm affixed to the handle.

14. A method for demounting a first and a second bead of a tire from a wheel assembly, the method comprising the steps of:

providing a demounting tool comprising a prying foot affixed to a handle, said prying foot comprising a predetermined length, said prying foot comprising a scooping portion for pulling an inside portion of the first bead or a bottom portion of the second bead of the tire over a rim flange, a fixed hook assembly for hooking the rim flange of the wheel assembly and a telescoping assembly for raising and lowering the prying foot in relation to the fixed hook assembly for peeling the first or second bead of the tire from the wheel assembly;

inserting the demounting tool between the tire and the wheel assembly;

engaging the prying foot with the first or second bead;

hooking the fixed hook assembly to the rim flange;

pivoting the handle; and activating the telescoping assembly to peel the first or second bead of the tire from the wheel assembly.

15. The method of claim 14 wherein the step of providing comprises selecting the predetermined length of the prying foot to be of sufficient length to engage a prying foot toe portion with the first bead.

16. The method of claim 14 wherein the step of providing comprises selecting the predetermined length of the prying foot to be of sufficient length to engage a prying foot toe portion with the second bead.

17. The method of claim 14 wherein the step of activating the telescoping assembly comprises converting a rotational motion into a linear motion.

18. The method of claim 14 wherein the step of pivoting comprises grasping a lever arm affixed to the handle and pivoting the handle towards a center of the wheel assembly.

19. The method of claim 14 wherein the step of inserting comprises providing a spear shaped member on an insertion side of the fixed hook assembly for aiding the insertion.

20. The method of claim 14 wherein the step of hooking comprises providing a "J" shaped member on an inner portion of the fixed hook assembly for engaging the fixed hook assembly to the rim flange.

* * * * *